United States Patent
Osawa

(10) Patent No.: US 10,750,107 B2
(45) Date of Patent: Aug. 18, 2020

(54) NOISE REMOVING CIRCUIT AND IMAGE SENSOR

(71) Applicant: OLYMPUS CORPORATION, Hachioji-shi, Tokyo (JP)

(72) Inventor: Masato Osawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 180 days.

(21) Appl. No.: 16/136,997

(22) Filed: Sep. 20, 2018

(65) Prior Publication Data

US 2019/0020834 A1  Jan. 17, 2019

Related U.S. Application Data

(63) Continuation of application No. PCT/JP2016/061761, filed on Apr. 12, 2016.

(51) Int. Cl.
*H04N 5/357* (2011.01)
*H04N 5/217* (2011.01)
(Continued)

(52) U.S. Cl.
CPC .......... *H04N 5/3575* (2013.01); *H04N 5/217* (2013.01); *H04N 5/3658* (2013.01);
(Continued)

(58) Field of Classification Search
CPC .... H04N 5/3575; H04N 5/365; H04N 5/3658; H04N 5/369; H04N 5/3698; H04N 5/378;
(Continued)

(56) References Cited

U.S. PATENT DOCUMENTS

2012/0133800 A1  5/2012  Jung et al.
2014/0184865 A1* 7/2014  Muto ............... H04N 5/378
                                                    348/300

FOREIGN PATENT DOCUMENTS

JP  2008-300941 A  12/2008
JP  2012-120168 A   6/2012
(Continued)

OTHER PUBLICATIONS

Yonemoto, "Foundations and applications of CCD/CMOS image sensors", CQ Publishing Co., Ltd., ISBN4-7898-3626-6, Aug. 10, 2003, cited in Specification, w/English partial translation (7 pages).
(Continued)

*Primary Examiner* — Twyler L Haskins
*Assistant Examiner* — Akshay Trehan
(74) *Attorney, Agent, or Firm* — Westerman, Hattori, Daniels & Adrian, LLP

(57) ABSTRACT

A noise removing circuit includes a capacitor, a buffer circuit, and a switch. The capacitor includes a first terminal and a second terminal. The buffer circuit includes a third terminal and a fourth terminal. The switch sets the capacitor and the buffer circuit to be in one of a first state and a second state. In the first state, the first terminal is connected to the fourth terminal, a reference voltage is input to the second terminal, and the third terminal is connected to the signal source. In the second state, the first terminal is connected to the signal source, and the second terminal is connected to the third terminal.

4 Claims, 14 Drawing Sheets

(51) Int. Cl.
   *H04N 5/365*    (2011.01)
   *H04N 5/369*    (2011.01)
   *H04N 5/378*    (2011.01)
   *H04N 5/363*    (2011.01)
   *H04N 5/374*    (2011.01)

(52) U.S. Cl.
   CPC ........... *H04N 5/3698* (2013.01); *H04N 5/378* (2013.01); *H04N 5/363* (2013.01); *H04N 5/374* (2013.01)

(58) Field of Classification Search
   CPC ...... H04N 5/363; H04N 5/374; H04N 5/3745; H04N 5/37452; H04N 5/217–2178; H04N 5/357–3675; G06T 5/002; G06T 5/005; G06T 5/006; G06T 2207/20182; G06K 9/40
   USPC ........ 348/241–251, 300, 308; 382/274, 275; 257/443
   See application file for complete search history.

(56) References Cited

FOREIGN PATENT DOCUMENTS

| | | |
|---|---|---|
| JP | 5596888 B1 | 9/2014 |
| WO | 2011/093225 A1 | 8/2011 |

OTHER PUBLICATIONS

International Search Report dated Jun. 28, 2016, issued in counterpart International Application No. PCT/JP2016/061761, w/English translation (4 pages).

\* cited by examiner

RELATED ART

NOISE REMOVING CIRCUIT AND IMAGE SENSOR

The present application is a continuation application based on International Patent Application No. PCT/JP 2016/061761 filed on Apr. 12, 2016, the content of which is incorporated herein by reference.

BACKGROUND OF THE INVENTION

Field of the Invention

The present invention relates to a noise removing circuit and an image sensor.

Description of Related Art

An image sensor including a noise removing unit is disclosed in Japanese Patent No. 5596888. FIG. 18 shows the configuration of a noise removing unit 243 and circuitry around thereof used in an image sensor according to a conventional technology.

As shown in FIG. 18, the noise removing unit 243 includes a transfer capacitor 252 and a clamp switch 253. The transfer capacitor 252 includes a first terminal and a second terminal. The first terminal of the transfer capacitor 252 is connected to a vertical transmission line 239. The second terminal of the transfer capacitor 252 is connected to a gate of a column source follower transistor 244. A clamp voltage Velp is input to a drain of the clamp switch 253. A source of the clamp switch 253 is connected to a second terminal of the transfer capacitor 252 and a gate of the column source follower transistor 244. A control signal φVCL is input to a gate of the clamp switch 253.

By inputting the control signal φVCL to the gate of the clamp switch 253, the clamp switch 253 is turned into an on state. At this time, the transfer capacitor 252 is reset in accordance with the clamp voltage Velp. The noise removing unit 243 generates an imaging signal corresponding to a difference between a pixel signal and a noise signal, thereby generating an imaging signal in which a noise component is removed. The imaging signal in which the noise component is removed by the noise removing unit 243 is input to the gate of the column source follower transistor 244.

A power source voltage VDD is input to a drain of the column source follower transistor 244. A source of the column source follower transistor 211 is connected to a drain of a column selecting switch 254. The imaging signal is input to the gate of the column source follower transistor 214 through the noise removing unit 243.

A drain of the column selecting switch 254 is connected to the source of the column source follower transistor 244. A source of the column selecting switch 254 is connected to a horizontal transmission line 258. A control signal φHCLK is input to a gate of the column selecting switch 254. By inputting the control signal φHCLK, the column selecting switch 254 is turned into the on state. Accordingly, the column selecting switch 254 outputs an imaging signal of the vertical transmission line 239 of a selected column to the horizontal transmission line 258.

SUMMARY OF THE INVENTION

According to a first aspect of the present invention, a noise removing circuit includes a capacitor, a buffer circuit, and a switch. The capacitor includes a first terminal and a second terminal and samples a signal output from a signal source. The buffer circuit includes a third terminal and a fourth terminal. A difference between a voltage of the third terminal and a voltage of the fourth terminal is a predetermined voltage. The switch sets the capacitor and the buffer circuit to be in one of a first state and a second state. In the first state, the first terminal is connected to the fourth terminal, a reference voltage is input to the second terminal, and the third terminal is connected to the signal source. In the second state, the first terminal is connected to the signal source, and the second terminal is connected to the third terminal.

According to a second aspect of the present invention, in the first aspect, a bias current may be supplied to the buffer circuit. The bias current in a first period may be higher than the bias current in a second period. The first period may include a timing at which a voltage of the signal output from the signal source is switched. The second period is different from the first period. The capacitor and the buffer circuit may be in the second state in the first period and the second period.

According to a third aspect of the present invention, in the first aspect, a reset voltage may be input to the fourth terminal only in a first period out of the first period and a second period. The first period may include a timing at which a voltage of the signal output from the signal source is switched. The second period may be different from the first period. The capacitor and the buffer circuit may be in the second state in the first period and the second period.

According to a fourth aspect of the present invention, an image sensor includes a plurality of noise removing circuit including the noise removing circuit and, a plurality of pixels. The plurality of pixels are disposed in a matrix pattern. A noise removing circuit is disposed for each column of the plurality of pixels. The signal source is the pixels.

DETAILED DESCRIPTION OF THE INVENTION

Embodiments of the present invention will be described with reference to the drawings.

First Embodiment

Figure 1:
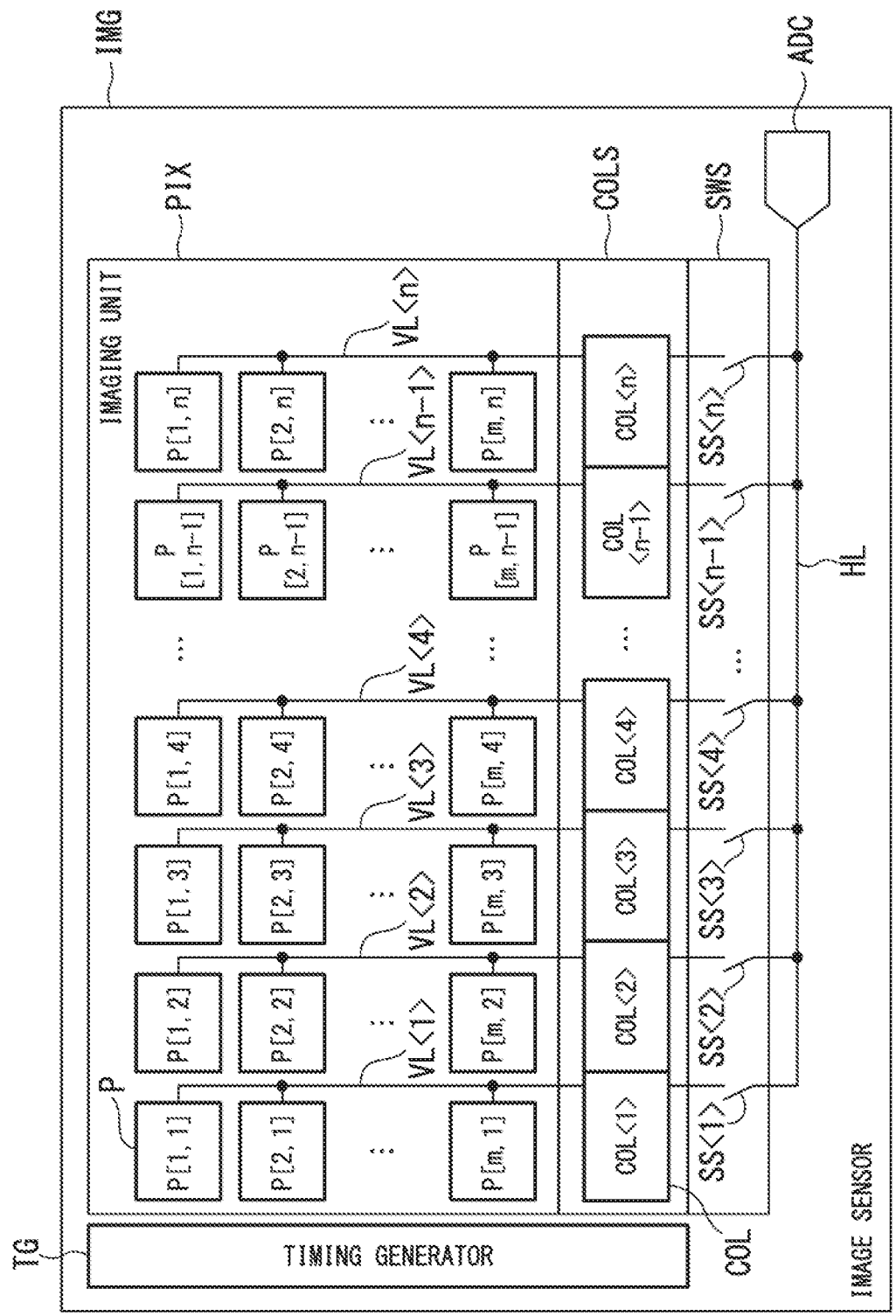
FIG. 1 is a block diagram showing the entire configuration of an image sensor according to a first embodiment of the present invention.

The entire configuration of an image sensor IMG according to a first embodiment of the present invention will be described with reference to FIG. 1. FIG. 1 shows the entire configuration of the image sensor IMG. As shown in FIG. 1, the image sensor IMG includes an imaging unit PIX, a timing generator TG, a noise removing unit COLS, a switching unit SWS, and an AD converter ADC.

The imaging unit PIX includes a plurality of pixels P disposed in a matrix pattern. In FIG. 1, some of the plurality of pixels P are not shown in a case in which a pixel P needs to be distinguished from the others, the pixel P is represented using a row number m and a column number n. Here, m is an arbitrary integer of one or more, and n is an arbitrary integer of two or more. A pixel P disposed in the i-th row and the j-th column is a pixel P[i, j]. Here, i is an integer that is one or more and in or less. In addition, j is an integer that is one or more and n or less. The imaging unit PIX includes m×n pixels P[1, 1] to P[m, n]. In addition, n vertical signal lines VL<1> to VL<n> are disposed in a column direction. The pixels P [1, 1] to P[m, n] are connected to the vertical signal lines VL<1> to VL<n> in for each column. In other words, the pixels P[1, j] to P[m, j] of the j-th column are connected to the vertical signal line VL<j>. Each pixel P outputs a reset signal at the time of resetting the pixel P and a video signal corresponding to light incident on the pixel P to the noise removing unit COLS. The pixel P includes a photodiode and accumulates a signal corresponding to light incident on the pixel P in the photodiode. The pixel P outputs a video signal based on the signal accumulated in the photodiode to the noise removing unit COLS.

The noise removing unit COLS includes a plurality of noise removing circuits COL disposed for each column of a plurality of pixels P. In FIG. 1, some of the plurality of noise removing circuits COL are not shown. In a case in which a noise removing circuit COL needs to be distinguished from the others, the noise removing circuit COL is represented using a column number n. A noise removing circuit COL disposed in the j-th column is a noise removing circuit COL<j>. The noise removing unit COLS includes n noise removing circuits COL<1> to COL<n>. The noise removing circuits COL<1> to COL<n> are respectively disposed for the vertical signal lines VL<1> to VL<n>. The noise removing circuit COL<j> of the j-th column is connected to the vertical signal line VL<j>. Reset signals and video signals output from the pixels P[1, j] to P[m, j] of the j-th column are input to the noise removing circuit COL<j> of the j-th column. The noise removing circuits COL<1> to COL<n> are connected to the switching unit SWS. The noise removing circuits COL<1> to COL<n> cancel reset noises and the like included in the video signals output from the pixels P[1, 1] to P[m, n]. Accordingly, the noise removing circuits COL<1> to COL<n> generate video signals VSIG and output the video signals VSIG to the switching unit SWS.

The switching unit SWS includes a plurality of switches SS<1> to SS<n> disposed for each column of a plurality of pixels P. Each of the switches SS<1> to SS<n> includes an input terminal and an output terminal. The input terminals of the switches SS<1> to SS<n> are respectively connected to the noise removing circuits COL<1> to COL<n>. The output terminals of the switches SS<1> to SS<n> are connected to the AD converter ADC through a horizontal signal line HL. The switches SS<1> to SS<n> are controlled using column selection signals CSEL<1> to CSEL<n> supplied from the timing generator TG. Switches belonging to a column selected using the column selection signals CSEL<1> to CSEL<n> form short circuits. Accordingly, a noise removing circuit COL belonging to the column selected using the column selection signals CSEL<1> to CSEL<n> is exclusively connected to the horizontal signal line HL. Switches belonging to columns not selected using the column selection signals CSEL<1> to CSEL<n> are open. For this reason, signals output from the noise removing circuits COL belonging to columns not selected using the column selection signals CSEL<1> to CSEL<n> are not input to the AD converter ADC.

The AD converter ADC is connected to the horizontal signal line HL. AD converter ADC converts a video signal VSIG (analog signal) output from the noise removing circuits COL<1> to COL<n> through the switches SS<1> to SS<n> into a signal.

The timing generator TG is connected to the imaging unit PIX, the noise removing unit COLS, the switching unit SWS, and the AD converter ADC by signal lines that are not shown in the drawing. The timing generator TG supplies a signal necessary for controlling the image sensor IMG to each unit.

The timing generator TG supplies a row selection signal RSEL<1> to a pixel P[1, 1] to a pixel P[1, n] of the first row and supplies a row selection signal RSEL<m> to a pixel P[m, 1] to a pixel P[m, n] of the m-th row. The timing generator TG also supplies similar signals to pixels P of the other rows. In a case in which a row selection signal RSEL<i> is "L (low)," a pixel P[i, 1] to a pixel P[i, n] to which a row selection signal RSEL<i> is supplied are not connected to vertical signal lines VL<1> to VL<n>. On the other hand, in a case in which the row selection signal RSEL<i> is "H (high)," the pixel P[i, 1] to the pixel P[i, n]

to which the row selection signal RSEL<i> is supplied are connected to the vertical signal lines VL<1> to VL<n>.

The timing generator TG supplies a control signal CLP_R and a control signal CLP_S to the noise removing circuits COL<1> to COL<n>. The control signal CLP_R is a control signal used for the noise removing circuits COL<1> to COL<n> to sample a reset signal output from a pixel P. At a timing at which a reset signal is output from the pixel P, the control signal CLP_R changes to "H." At this time, the noise removing circuits COL<1> to COL<n> sample the reset signal. When the control signal CLP_R changes to "L" the sampling operation ends.

The control signal CLP_S is a control signal used for the noise removing circuits COL<1> to COL<n> to sample a video signal output from a pixel P. At a timing at which the video signal is output from the pixel P, the control signal CLP_S changes to "H." At this time, the noise removing circuits COL<1> to COL<n> sample a video signal. When the control signal CLP_S changes to "L," the sampling operation ends.

The timing generator TG respectively supplies column selection signals CSEL<1> to CSEL<n> to the switches SS<1> to SS<n>. When the column selection signals CSEL<1> to CSEL<n> change to "H," the switches SS<1> to SS<n> to which the column selection signals CSEL<1> to CSEL<n>, in which the changes occur, are supplied form short circuits. For this reason, the noise removing circuits COL<1> to COL<n> connected to the switches SS<1> to SS<n> that for the short circuits are connected to the horizontal signal line HL. At this time, each of the noise removing circuits COL<1> to COL<n> outputs a video signal VSIG<x> based on a difference VPIX<x> between a reset signal and a video signal to the AD converter ADC. Here, x is an integer that is "1" or more and "n" or less. The video signal VSIG<x> is a signal a reference of which is a reference voltage VREF.

The video signal VSIG is represented using Equation (1). The video signal VSIG has a negative polarity.

$$VSIG = VREF - VPIX<x> \quad (1)$$

For example, in a case in which a signal supplied from a pixel P is at a minimum level (black level), the video signal VSIG is represented using Equation (2). On the other hand, in a case in which a signal supplied from the pixel P is at a maximum level (saturated level), the video signal VSIG is represented using Equation (3). In Equation (3), VSAT is a saturated (maximum) voltage of VPIX.

$$VSIG = VREF - 0 \quad (2)$$

$$VSIG = VREF - VSAT \quad (3)$$

In the example described above, the video signal VSIG has a negative polarity. However, the video signal VSIG may have a positive polarity.

Figure 2:
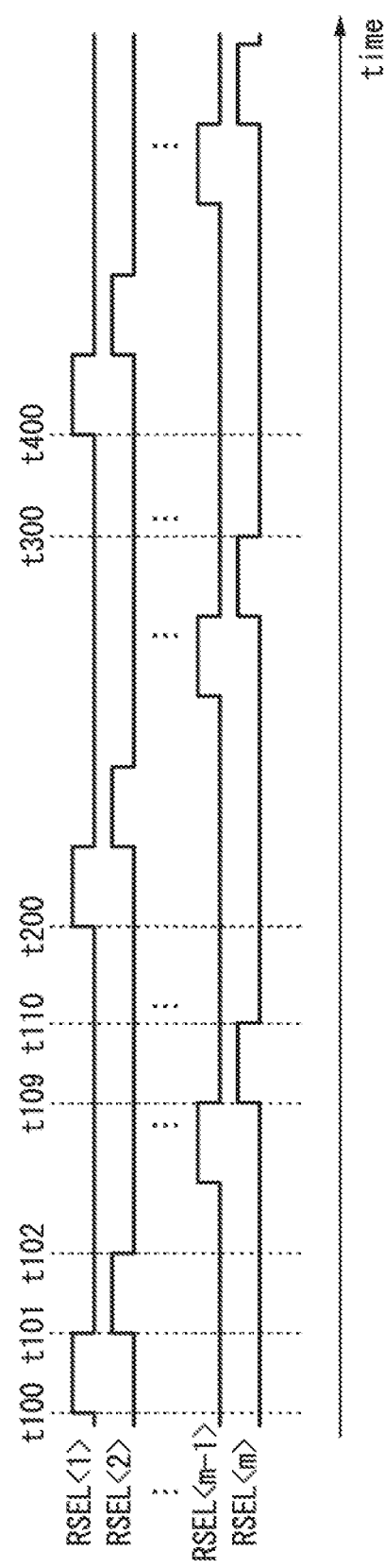
FIG. 2 is a timing diagram showing an operation of the image sensor according to the first embodiment of the present invention.
Figure 3:
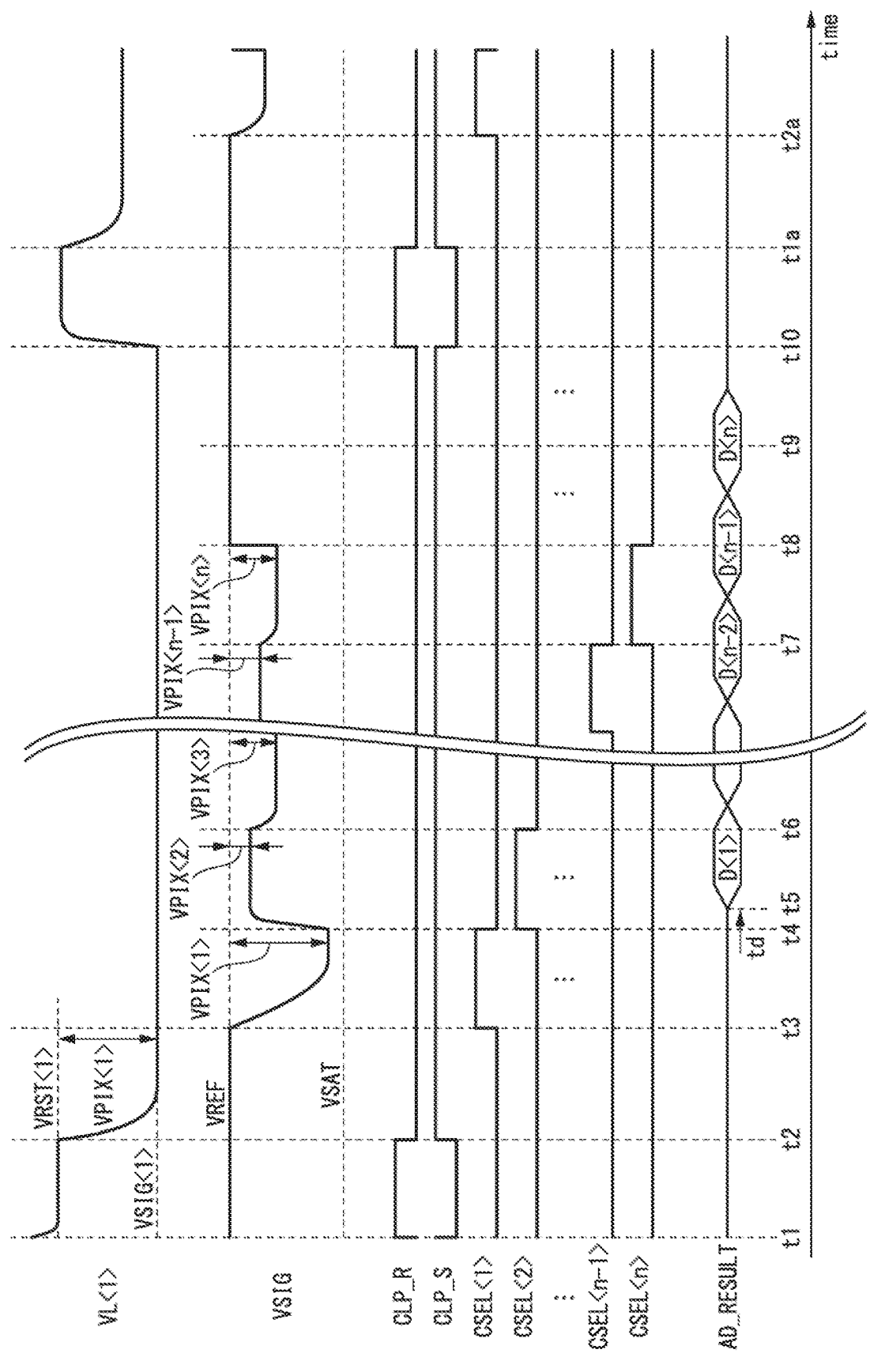
FIG. 3 is a timing diagram showing an operation of the image sensor according to the first embodiment of the present invention.

A signal reading operation using the image sensor IMG will be described in more detail with reference to FIGS. 2 and 3. FIGS. 2 and 3 show signals regarding the operation of the image sensor IMG. In FIG. 2, row selection signals RSEL<1> to RSEL<m> are shown. In FIG. 3, the electric potential of a vertical signal line VL<1>, a video signal VSIG, a control signal CLP_R, a control signal CLP_S, and column selection signals CSEL<1> to CSEL<n> are shown. In FIG. 3, a bit stream D<1> to D<n> of an AD conversion result (AD_RESULT) is shown. In FIGS. 2 and 3, the horizontal axis represents time, and the vertical axis represents a signal level. The resolution in the time direction is different between FIGS. 2 and 3. In FIG. 2, a period of a time t100 to a time t101 corresponds to a period of time t1 to t10 shown in FIG. 3.

At the time t100, the row selection signal RSEL<1> changes to "H." The row selection signals RSEL<2> to RSEL<m> are maintained at "L." At a time t101, the row selection signal RSELK1> changes to "L," and the row selection signal RSEL<2> changes to "H." Thereafter, row selection signals RSEL<3> to RSEL<m> of each row sequentially change to "H." At a time t109, a row selection signal RSEL<m-1> changes to "L," and a row selection signal RSEL<m> changes to "H." At a time t110, the row selection signal RSEL<m> changes to "L." Changes in the row selection signals RSEL<1> to RSEL<m> from a time t200 to a time t300 are similar to the changes in the row selection signals RSEL<1> to RSEL<m> from the time t100 to the time t110.

Before signals supplied from the pixels P[1, 1] to P[1, n] of the first row are read at a time t1 shown in FIG. 3, the photodiodes of the pixels P[1, 1] to P[1, n] are reset to a predetermined voltage and are exposed for a predetermined time. Hereinafter, the description focus on reading of signals supplied from the pixels P[1, 1] to P[1, n] of the first row. Reading of signals supplied from pixels P of the other rows is similar to the reading of the signals supplied from the pixels P of the first row.

At the time t1, the row selection signal RSEL<1> becomes "H," and thus the pixels P[1, 1] to P[1, n] of the first row are respectively connected to the vertical signal lines VL<1> to VL<n>. At this timing, the pixels P[1, 1] to P[1, n] respectively start to output reset signals VRST<1> to VRST<n>. Only a reset signal VRST<1> of the first column among the reset signals VRST<1> to VRST<1> of each column is representatively shown in FIG. 3. At this timing, the control signal CLP_R becomes "H." Accordingly, the noise removing circuits COL<1> to COL<n> start sampling operations of the reset signals VRST<1> to VRST<n>.

After a predetermined time elapses from the time t1, and the reset signals VRST<1> to VRST<n> are stabilized, the control signal CLP_R becomes "L" at a time t2. Accordingly, the levels of the reset signals stored in the noise removing circuits COL<1> to COL<n> are determined. At this timing, the pixels P[1, 1] to P[1, n] start to output video signals PIXOUT<1> to PIXOUT<n>. Simultaneously the control signal CLP_S becomes "H." Accordingly, the noise removing circuits COL<1> to COL<n> start operations of sampling the video signals PIXOUT<1> to PIXOUT<n>.

At a time t3, the video signals PIXOUT<1> to PIXOUT<n> of the noise removing circuits COL<1> to COL<n> reaches readable levels. At a time t3, the noise removing circuits COL<1> to COL<n> end the operations of sampling the video signals PIXOUT<1> to PIXOUT<n>. Inside the noise removing circuits COL<1> to COL<n>, reset noise and the like of pixels included in the video signals PIXOUT<1> to PIXOUT<n> input from the pixels P[1, 1] to P[1, n] is cancelled out. The noise removing circuits COL<1> to COL<n> store video signals VSIG having amplitudes of VPIX<1> to VPIX<n> a reference of which is the reference voltage VREF.

The operation of sampling the noise removing circuits COL<1> to COL<n> ends at a time t3. However, in order to cause the noise removing circuits COL<L> to COL<n> to continue to hold the signal level held by the sampling operation, the control signal CLP_S continuously maintains the "H" state.

At the time t3 the column selection signal CSEL<1> becomes "H," whereby the switch SS<1> becomes short-circuited. For this reason, a video signal VSIG having an amplitude of VPLK<1> is output from the noise removing circuit COL<1> of the first column. This signal is sampled by the AD converter ADC. This sampling operation is completed at a timing at which the column selection signal CSEL<1> becomes "L" at a time t4. Simultaneously with this, the column selection signal CSEL<2> becomes "H," whereby the switch SS<2> becomes short-circuited. For this reason, a video signal VSIG having an amplitude of VPIX<2> is output from the noise removing circuit COL<2> of the second column. This signal is sampled by the AD converter ADC as well.

At the time t4, simultaneously with the completion of an operation of sampling the video signal VSIG having an amplitude of VPIX<1>, the AD converter ADC starts an AD conversion operation for the video signal VSIG having the amplitude of VPIX<1>. At a time t5 when a conversion time td elapses after the time t4, the AD converter ADC updates the AD conversion result AD_RESULT and outputs a bit stream D<1> as a result of the conversion.

At a time t6, the column selection signal CSEL<2> becomes "L." Also after the time t6, similarly, the column selection signals CSEL<3> to CSEL<n> sequentially become "H," whereby video signals VSIG are sequentially output from the noise removing circuits COL<3> to COL<n> and are input to the AD converter ADC. An operation of sampling the video signal VSIG output from the noise removing circuit COL<n> starts at a time t7 and ends at a time t8.

At a moment at which the column selection signals CSEL<1> to CSEL<n> are switched from "H" to "L," the AD converter ADC ends sampling of a video signal VSIG output from a noise removing circuit COL<i> corresponding to a column selection signal CSEL<i> and starts AD conversion. When the AD conversion ends, the AD converter ADC updates the bit stream D<1> to D<n> and sequentially outputs (updates) AD conversion results AD_RESULT. An AD conversion operation for the video signal VSIG output from the noise removing circuit COL<n> starts at a time t8 and ends at a time t9. At a time t10, the control signal CLP_S becomes "L."

At a time t101 (corresponding to the time t10) after the end of reading from a pixel P[1, n] of the first row and the n-th column, the row selection signal RSEL<1> is switched from "H" to "L." Simultaneously, the row selection signal RSEL<2> is switched from "L" to "H." Thereafter, signals supplied from pixels P that are the pixel P[2, 1] of the second row and the first column to the pixel P[2, n] of the second row and the n-th column are read through the noise removing circuits COL<1> to COL<n>. Thereafter, similarly signals supplied from pixels P of the third row to the m-th row are read, and the reading ends at a time t300. After this reading ends, exposure of each pixel P is performed again. After the exposure ends, at a time t400, the row selection signal RSEL<1> is switched from "L" to "H," and thus reading from the pixels P[1, 1] to P[1, n] of the first row is started again.

As described above, the image sensor IMG includes at least the noise removing circuits COL and a plurality of pixels P. The plurality of pixels P are disposed in a matrix pattern. The noise removing circuit COL is disposed for each column of the plurality of pixels P. A signal source is a pixel P.

Figure 4:
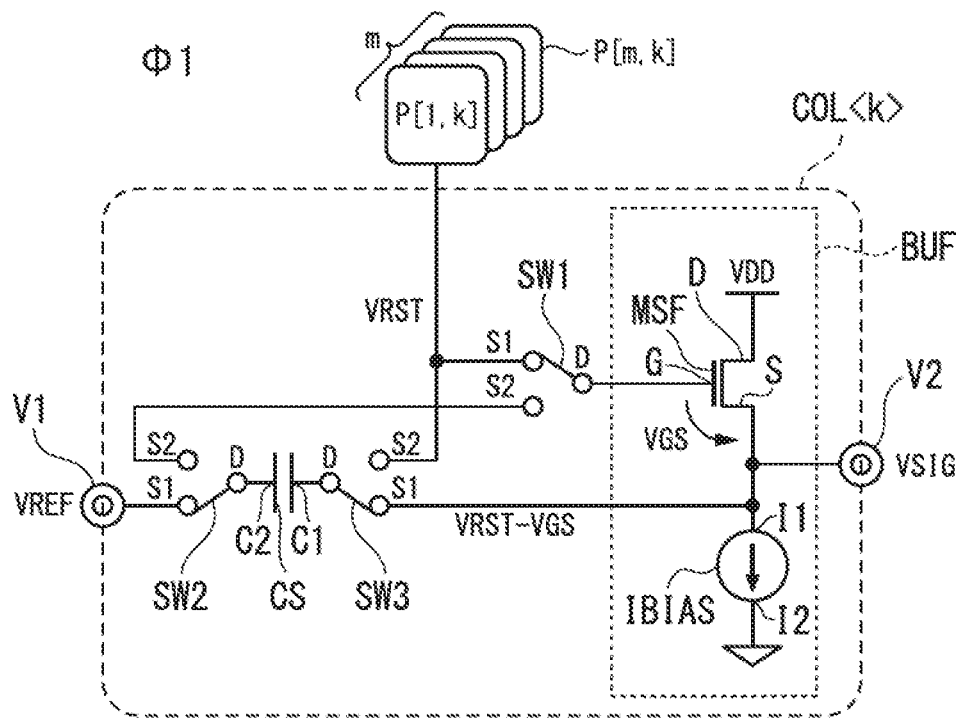
FIG. 4 is a circuit diagram showing the configuration of a noise removing circuit according to the first embodiment of the present invention.
Figure 5:
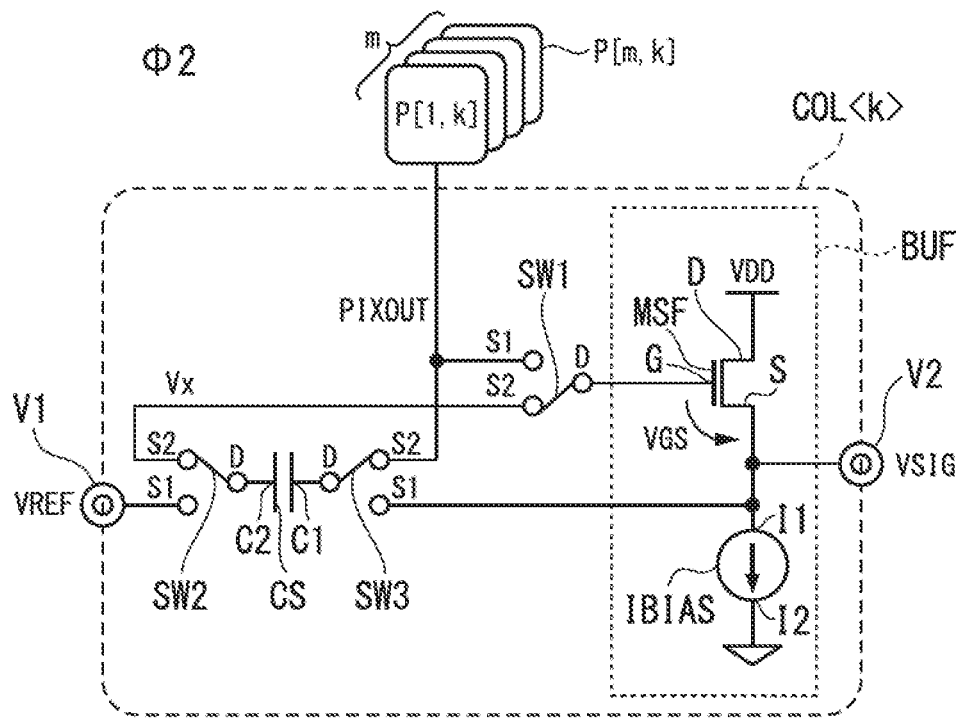
FIG. 5 is a circuit diagram showing the configuration of a noise removing circuit according to the first embodiment of the present invention.

The configuration of the noise removing circuit COL will be described with reference to FIGS. 4 and 5. FIGS. 4 and 5 show the configuration of a noise removing circuit COL<k> to which signals from pixels P[1, k] to P[m, k] of the k-th column are input. The configuration of the noise removing circuit COL to which signals from pixels P of another column are input is the same as the configuration of the noise removing circuit COL<1>. Hereinafter, the configuration and the operation of the noise removing circuit COL<k> will be representatively described. FIG. 4 shows a state Φ1 of the noise removing circuit COL<k>, and FIG. 5 shows a state Φ2 of the noise removing circuit COL<k>.

A schematic configuration of the noise removing circuit COL<k> will be described. The noise removing circuit COL<k> includes at least a sampling capacitor CS, a buffer circuit BUF, and switches SW1, SW2, and SW3. The sampling capacitor CS includes a first terminal and a second terminal and samples a signal output from a signal source. The buffer circuit BUF includes a third terminal and a fourth terminal. A difference between a voltage of the third terminal and a voltage of the fourth terminal is a predetermined voltage. The switches SW1, SW2, and SW3 set the sampling capacitor CS and the buffer circuit BUF to be in one of a first state and a second state. In the first state (Φ1), the first terminal is connected to the fourth terminal, a reference voltage is input to the second terminal, and the third terminal is connected to a signal source (pixel). In the second state (Φ2), the first terminal is connected to the signal source, and the second terminal is connected to the third terminal.

A detailed configuration of the noise removing circuit COL<k> will be described. The buffer circuit BUF includes a column source follower transistor MSF and a current source IBIAS. The sampling capacitor CS includes a first terminal C1 and a second terminal C2. Each of the switches SW1, SW2, and SW3 includes a first terminal S1, a second terminal S2, and a third terminal D. The column source follower transistor MSF includes a gate G (third terminal), a source S (fourth terminal), and a drain D. The current source IBIAS includes a first terminal I1 and a second terminal I2.

The noise removing circuit COL<k> includes a plurality of switches. More specifically, the noise removing circuit COL<k> includes a switch SW1, a switch SW2, and a switch SW3. The first terminal S1 of the switch SW1 is connected to pixels P[1, k] to P[m, k] that are signal sources. The second terminal S2 of the switch SW1 is connected to the second terminal S2 of the switch SW2. The third terminal D of the switch SW1 is connected to a gate G of the column source follower transistor MSF. The state of the switch SW1 is switched between a first state and a second state. When the switch SW1 is in the first state, the first terminal S1 of the switch SW1 and the third terminal D of the switch SW1 are electrically connected. When the switch SW1 is in the second state, the second terminal S2 of the switch SW1 and the third terminal D of the switch SW1 are electrically connected.

The first terminal S1 of the switch SW2 is connected to an input terminal V1 of the noise removing circuit COL<k>. The reference voltage VREF is input to the input terminal V1 of the noise removing circuit COL<k>. The reference voltage VREF input to the input terminal V1 is input to the first terminal S1 of the switch SW2. The second terminal S2 of the switch SW2 is connected to the second terminal S2 of the switch SW1. The third terminal D of the switch SW2 is connected to the second terminal C2 of the sampling capacitor CS. The state of the switch SW2 is switched between a first state and a second state. When the switch SW2 is in the first state, the first terminal S1 of the switch SW2 and the third terminal D of the switch SW2 are electrically connected. When the switch SW2 is in the second state, the second terminal S2 of the switch SW2 and the third terminal D of the switch SW2 are electrically connected.

The first terminal S1 of the switch SW3 is connected to the source S of the column source follower transistor MSF. The second terminal S2 of the switch SW3 is connected to pixels P[1, k] to P[m, k] that are signal sources. The third terminal D of the switch SW3 is connected to a first terminal C1 of the sampling capacitor CS. The state of the switch SW3 is switched between a first state and a second state. When the switch SW3 is in the first state, the first terminal S1 of the switch SW3 and the third terminal D of the switch SW3 are electrically connected. When the switch SW3 is in the second state, the second terminal S2 of the switch SW3 and the third terminal D of the switch SW3 are electrically connected.

The power source voltage VDD is input to the drain D of the column source follower transistor MSF. The source S of the column source follower transistor MSF is connected to the first terminal S1 of the switch SW3 and an output terminal V2 of the noise removing circuit COL<k>. The gate G of the column source follower transistor MSF is connected to the third terminal D of the switch SW1. The video signal VSIG is output from the source S of the column source follower transistor MSF. The video signal VSIG is output from the output terminal V2 of the noise removing circuit COL<k> to a signal processing circuit of a later stage.

The first terminal I1 of the current source IBIAS is connected to the source S of the column source follower transistor MSF. The second terminal I2 of the current source IBIAS is connected to the ground. The column source follower transistor MSF and the current source IBIAS constitute a source follower.

In a case in which the control signal CLP_R is "H," and the control signal CLP_S is "L," the noise removing circuit COL<k> is turned into the state Φ1 shown in FIG. 4. In the state Φ1, the switches SW1, SW2, and SW3 are turned into the first state. In a case in which the control signal CLP_R is "L," and the control signal CLP_S is "H," the noise removing circuit COL<k> is turned into the state Φ2 shown in FIG. 4. In the state Φ2, the switches SW1, SW2, and SW3 are turned into the second state.

The operation of the noise removing circuit COL<k> in the state Φ1 will be described. When the noise removing circuit COL<k> is in the state Φ1, in each of the switches SW1, SW2, and SW3, the first terminal S1 and the third terminal D are electrically connected. One of m pixels P[1, k] to P[m, k] connected to the noise removing circuit COL<k> is selected, and the selected pixel P outputs a reset signal VRST. Since the column source follower transistor MSF and the current source IBIAS constitute a source follower, the video signal VSIG is represented by Equation (4). In Equation (4), for the convenience of description, the voltage of the video signal VSIG will be denoted by VSIG, and the voltage of the reset signal VRST will be denoted by VRST.

$$VSIG=VRST-VGS \quad (4)$$

In Equation (4), VGS represents a gate-to-source voltage of the column source follower transistor MSF. A difference between the voltages of the gate G and the source S of the column source follower transistor MSF is a predetermined voltage VGS. The voltage VGS is determined in accordance with a threshold voltage of the column source follower transistor MSF and a bias current value of the current source IBIAS. A variation in the voltage VGS is mainly based on a threshold variation of the column source follower transistor MSF. The voltage represented by Equation (4) is input to the first terminal C1 of the sampling capacitor CS. Meanwhile, the reference voltage VREF is input to the second terminal C2 of the sampling capacitor CS through the switch SW2. Accordingly, electric charge Q(Φ1) sampled in the sampling capacitor CS is given by Equation (5). In Equation (5), for the convenience of description, the capacitance value of the sampling capacitor CS is denoted by CS. The sampling capacitor CS samples a voltage of a difference between a voltage based on a voltage VRST of a reset signal VRST and the voltage VGS, and the reference voltage VREF.

$$Q(\Phi 1)=CS\{(VRST-VGS)-VREF\} \quad (5)$$

The operation of the noise removing circuit COL<k> in the state Φ2 will be described. While the noise removing circuit COL<k> is in the state Φ2, in each of the switches SW1, SW2, and SW3, the second terminal S2 and the third terminal D are electrically connected. A pixel P outputting the reset signal VRST in the state Φ1 outputs a video signal PIXOUT in the state Φ2. The video signal PIXOUT is input to the first terminal C1 of the sampling capacitor CS. On the other hand, the second terminal C2 of the sampling capacitor CS is connected to the gate G of the column source follower transistor MSF through the switch SW2 and the switch SW1. Electric charge Q(Φ2) sampled in the sampling capacitor CS is given by Equation (6). In Equation (6), Vx represents a voltage of the second terminal C2 of the sampling capacitor CS, in other words, a voltage of the gate G of the column source follower transistor MSF. The sampling capacitor CS samples a voltage of a difference between a voltage PIXOUT of the video signal PIXOUT and a voltage Vx of the gate G of the column source follower transistor MSF.

$$Q(\Phi 2)=CS(PIXOUT-Vx) \quad (6)$$

Since electric charge conserved in the sampling capacitor CS between the state Φ1 and the state Φ2 is constant, Equation (7) is satisfied.

$$Q(\Phi 1)=Q(\Phi 2) \quad (7)$$

By substituting Equation (5) and Equation (6) into Equation (7) and acquiring Vx, Equation (8) is satisfied. For this reason, the video signal VSIG is represented by Equation (9). As represented by Equation (9), the noise removing circuit COL<k> outputs a video signal VSIG having a voltage a reference of which is the reference voltage VREF. As represented by Equation (9), there is no influence of the voltage VGS on the video signal VSIG. For this reason, the video signal VSIG is not influenced by the threshold variation of the column source follower transistor MSF.

$$Vx=(PIXOUT-VRST)+VGS+VREF \quad (8)$$

$$VSIG=Vx-VGS=(PIXOUT-VRST)+VREF \quad (9)$$

The operation described above can be regarded as a modified example of a CDS (correlated double sampling) noise canceller. For this reason, an offset voltage VGS generated by the column source follower transistor MSF and flicker noise generated by the column source follower transistor MSF are cancelled out. The operation principle of the CDS noise canceller and effects of noise reduction acquired thereby are described in the following Non Patent Literature. For this reason, a detailed description of the operation principle of the CDS noise canceller will not be presented here.

Non Patent Literature: "Fundamentals and Applications of CCD/CMOS Image Sensors," Kazuya Yonemoto, CQ Publication, ISBN 4-7898-3626-6

Figure 6:
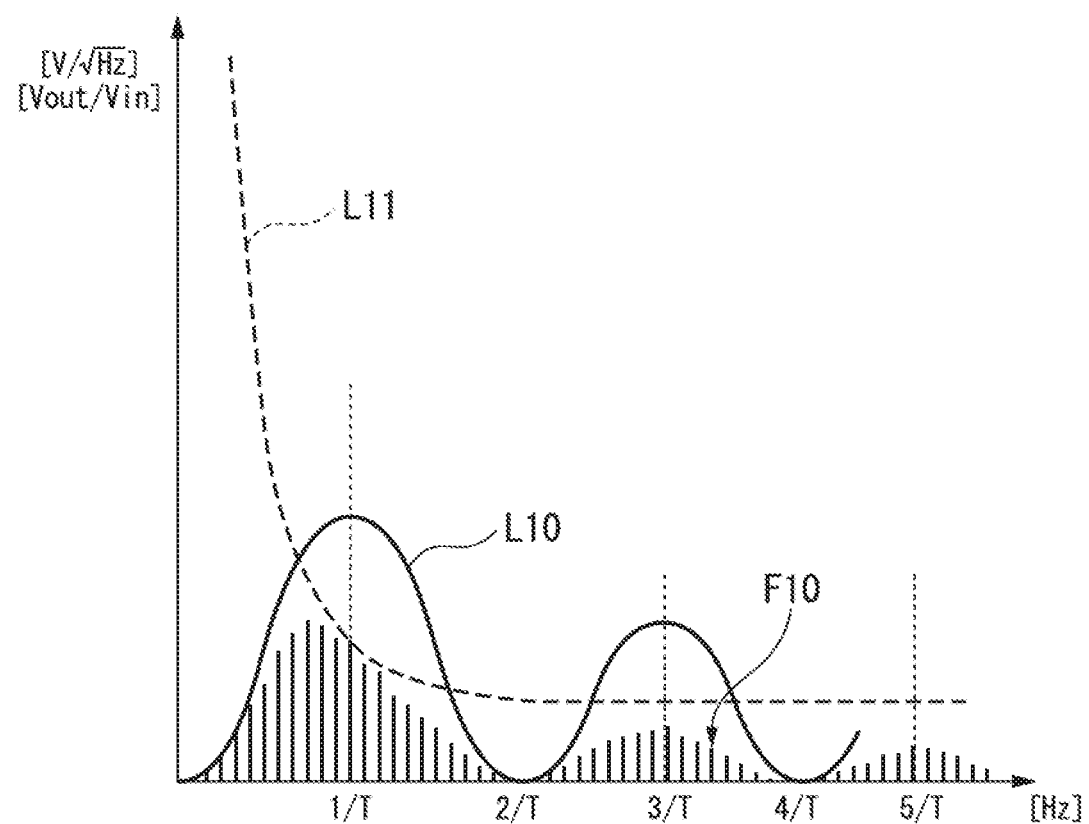
FIG. 6 is a graph showing an effect of noise reduction acquired a CDS noise canceller according to the first embodiment of the present invention.

FIG. 6 shows the effects of noise reduction acquired by a CDS noise canceller. In FIG. 6, the horizontal axis represents a frequency. In FIG. 6, the vertical axis represents an output-converted noise density and transfer characteristics of a noise removing circuit COL. The CDS noise canceller has transfer characteristics represented by a line L10. The CDS noise canceller does not transfer a DC signal and a signal having a frequency of 2/T to a signal processing circuit of a later stage. 1/T is an operation frequency of the CDS circuit. A line L11 represents an output-converted noise density of the column source follower transistor MSF. As denoted by the line L11, noise output by the column source follower transistor MSF is attenuated by the function of a CDS circuit. A figure F10 highlighted using vertical lines represents spectrum characteristics of noise output by the column source follower transistor MSF. The total sum of noise output from the noise removing circuit COL is an area below a curve passing through upper ends of the vertical lines composing the figure F10. The total sum of noise of the column source follower transistor MSF in a case in which noise canceling using the CDS is not performed is the total sum of an area below the line L11. The total sum of the noise output from the noise removing circuit COL is markedly smaller than the total sum of the noise of the column source follower transistor MSF of a case in which noise canceling using the CDS is not performed.

The signal input to the noise removing circuit according to each aspect of the present invention may be a signal other than a video signal. The image sensor according to each aspect of the present invention need not include components other than the noise removing circuit and the plurality of pixels.

The noise removing circuit COL according to the first embodiment outputs only a video signal VSIG a reference of which is a predetermined reference voltage VREF regardless of a variation of the threshold voltage (VGS) of the column source follower transistor MSF. For this reason, the noise removing circuit COL and the image sensor IMG can eliminate the influence of the threshold voltage (VGS) that is an offset voltage generated in the buffer circuit BUF inside the noise removing circuit COL. Deterioration of the linearity of a signal processing circuit of a later stage is decreased by the noise removing circuit COL. In the first embodiment, the linearity of the signal processing circuit of the later stage is the conversion accuracy of the AD converter ADC. According to the first embodiment, an image sensor IMG having high performance can be provided. The noise removing circuit COL operates as a CDS circuit. For this reason, the noise removing circuit COL and the image sensor IMG significantly reduce the influence of flicker noise generated by the column source follower transistor MSF and can output a video signal VSIG having a high S/N to the signal processing circuit of a later stage.

Second Embodiment

Figure 7:
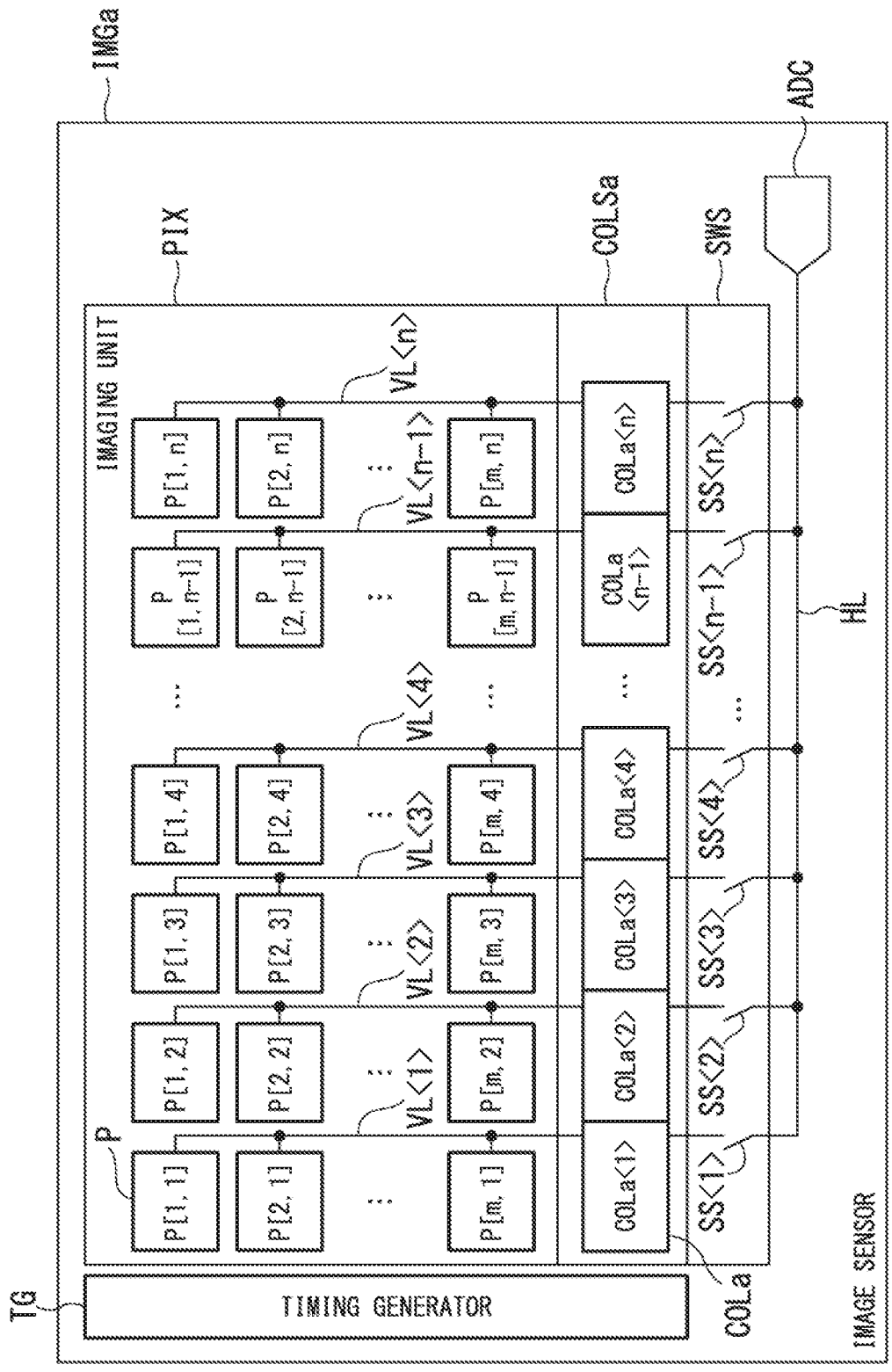
FIG. 7 is a block diagram showing the entire configuration of an image sensor according to a second embodiment of the present invention.

The configuration of an image sensor IMGa according to a second embodiment of the present invention be described with reference to FIG. 7. FIG. 7 shows the configuration of the image sensor IMGa. In the configuration shown in FIG. 7, points different from the configuration shown in FIG. 1 will be described.

In the image sensor IMGa, the noise removing unit COLS of the image sensor IMG shown in FIG. 1 is replaced with a noise removing unit COLSa. In the noise removing unit COLSa, the noise removing circuit COL of the noise removing unit COLS shown in FIG. 1 is replaced with a noise removing circuit COLa. Regarding points other than the points described above, the configuration shown in FIG. 7 is similar to the configuration shown in FIG. 1.

Figure 8:
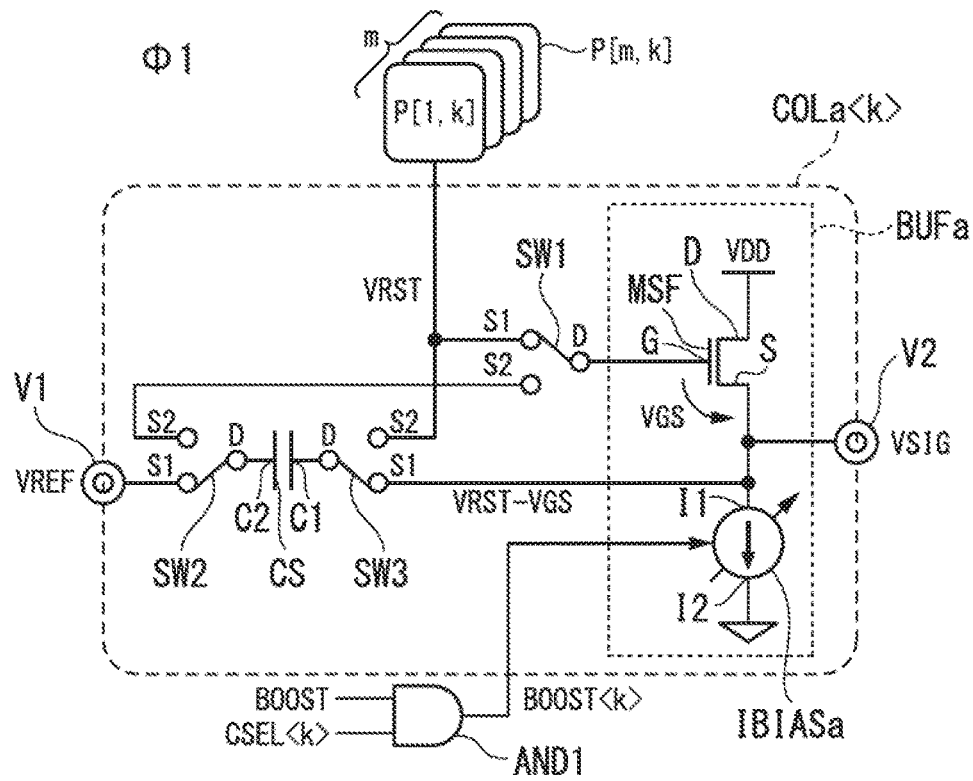
FIG. 8 is a circuit diagram showing the configuration of a noise removing circuit according to the second embodiment of the present invention.
Figure 9:
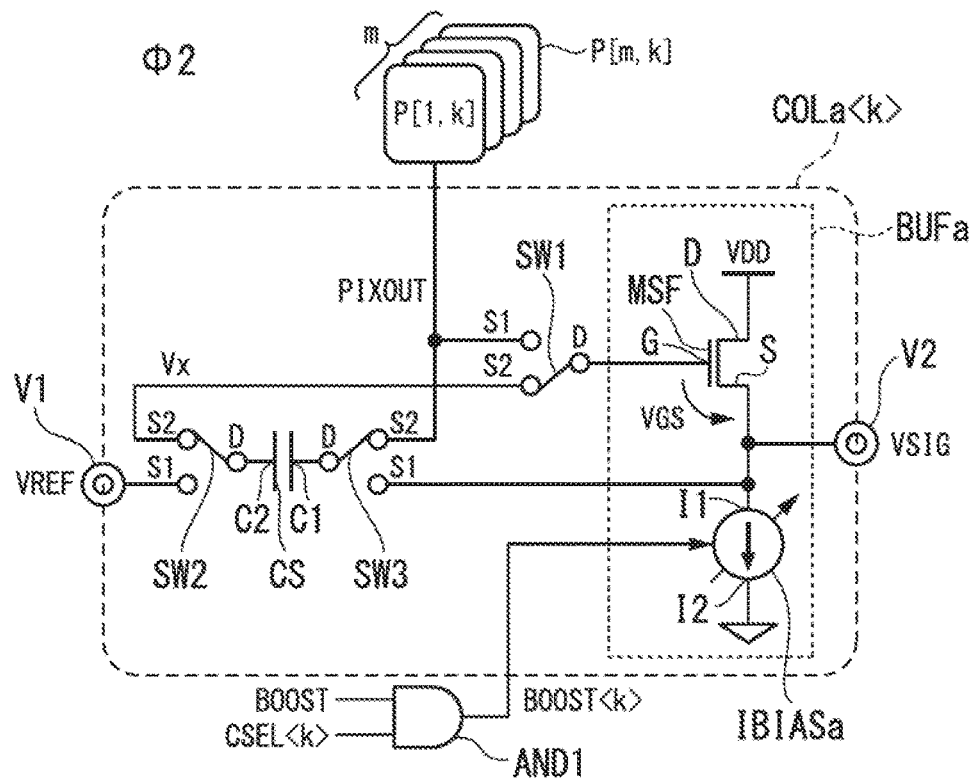
FIG. 9 is a circuit diagram showing the configuration of a noise removing circuit according to the second embodiment of the present invention.

The configuration of the noise removing circuit COLa will be described with reference to FIGS. 8 and 9. FIGS. 8 and 9 show the configuration of a noise removing circuit COLa<k> to which signals from pixels P[1, k] to P[m, k] of the k-th column are input. The configuration of a noise removing circuit COLa to which signals from pixels P of another column are input is the same as the configuration of the noise removing circuit COLa<k>. Hereinafter, the configuration and the operation of the noise removing circuit COLa<k> will be representatively described. In the configuration shown in FIGS. 8 and 9, points different from the configuration shown in FIGS. 4 and 5 will be described. FIG. 8 shows a state Φ1 of the noise removing circuit COLa<k>, and FIG. 9 shows a state Φ2 of the noise removing circuit COLa<k>.

In the noise removing circuit COLa, the buffer circuit BUF of the noise removing circuit COL shown in FIGS. 4 and 5 is replaced with a buffer circuit BUFa. In the buffer circuit BUFa, the current source IBIAS of the buffer circuit BUF shown in FIGS. 4 and 5 is replaced with a current source IBIASa. A control signal BOOST<k> is input to the current source IBIASa. A current flowing through the current source IBIASa can be changed. In a case in which the control signal BOOST<k> is "L," the current source IBIASa operates as a constant current source causing a first current to flow. In a case in which the control signal BOOST<k> is "H," the current source IBIASa operates as a constant current source causing a second current to flow. The second current is a current higher than the first current. An AND circuit AND1 calculates a logical product of a control signal BOOST and a column selection signal CSEL<k> and outputs a control signal BOOST<k>. The control signal BOOST be described later.

By employing the configuration described above, a bias current is supplied to the buffer circuit BUFa. A bias current in a first period is higher than a bias current in a second period. The first period includes a timing at which a voltage of a signal output from a signal source is switched. The second period is different from the first period. In the first period and the second period, the sampling capacitor CS and the buffer circuit BUFa are in the second state (Φ2).

Regarding points other than those described above, the configuration shown in FIGS. 8 and 9 is similar to the configuration shown in FIGS. 4 and 5.

Figure 10:
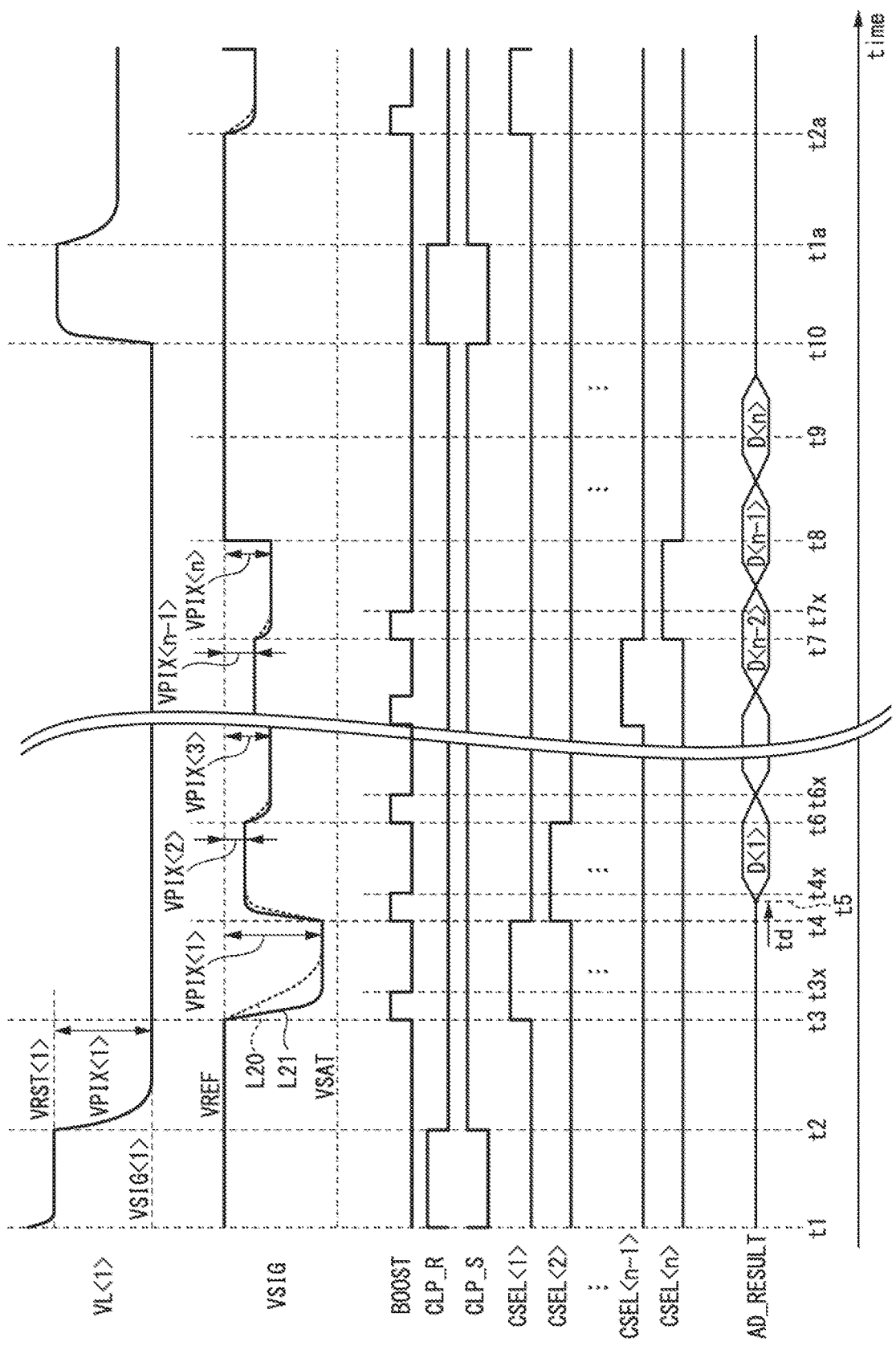
FIG. 10 is a timing diagram showing an operation of the image sensor according to the second embodiment of the present invention.

A signal reading operation using the image sensor IMGa will be described in more detail with reference to FIG. 10. FIG. 10 shows signals regarding the operation of the image sensor IMGa. In FIG. 10, points different from those shown in FIG. 3 will be described. In FIG. 10, in addition to the signals shown in FIG. 3, a control signal BOOST is shown.

Most of the operation of the image sensor IMGa is the same as the operation of the image sensor IMG according to the first embodiment, and thus, only featured parts of the operation of the image sensor IMGa will be described. In the image sensor IMGa, settling characteristics of the video signal VSIG are enhanced using the control signal BOOST and the current source IBIASa. For clear description of the enhancement of the settling characteristics, in FIG. 10, a transient response of a video signal VSIG output from the image sensor IMG is denoted by a line L20, and a transient response of a video signal VSIG output from the image sensor LMGa is denoted by a line L21.

At a time t1, noise removing circuits COLa<1> to COLa<n> start operations of sampling reset signals VRST<1> to VTST<n>. At a time t2, the noise removing circuits COLa<1> to COLa<n> start operations of sampling video signals PIXOUT<1> to PIXOUT<n>. At a time t3, the noise removing circuits COLa<1> to COLa<n> end the operations of sampling the video signals PIXOUT<1> to PIXOUT<n>. Inside the noise removing circuits COLa<1> to COLa<n>, reset noise of pixels and the like included in the video signals PIXOUT<1> to PIXOUT<n> input from the pixels P[1, 1] to P[1, n] are cancelled out. The noise removing circuits COLa<1> to COLa<n> store video signals VSIG having amplitudes of VPIX<1> to VPIX<n> a reference of which is the reference voltage VREF. The operations of the noise removing circuits COLa<1> to COLa<n> from the time t1 to the time t3 are the same as the operations of the noise removing circuits COL<1> to COL<n> shown in FIG. 3.

At the time t3, the column selection signal CSEL<1> becomes "H," whereby the switch SS<1> of the first column becomes short-circuited. For this reason, a video signal VSIG having an amplitude of VPIX<1> is output from the noise removing circuit COLa<1> of the first column. At the time t3, the control signal BOOST becomes "H." Since both the column selection signal CSEL<1> and the control signal BOOST are "H," BOOST<k> that is a logical product thereof becomes "H" as well. For this reason, the current source IBIASa operates in accordance with a second current. In a period of the time t3 to a time t3x, since the control signal BOOST is "H," the buffer circuit BUFa operates in accordance with a second current higher than the first current.

The buffer circuit BUFa is a source follower circuit constituted by the column source follower transistor MSF and the current source IBIASa. The falling speed of the video signal VSIG is determined in accordance with the amount of bias current of the current source IBIASa. Accordingly, the voltage of the video signal VSIG output from the noise removing circuit COLa<1> reaches a target voltage at a speed higher than that of the case of the noise removing circuit COL<1> according to the first embodiment. The target voltage is (VREF−VPIX<1>). At the time tax, the control signal BOOST becomes "L," and thus, the control signal BOOST<k> becomes "L." For this reason, the current source IBIASa operates in accordance with the first current. A voltage output by the buffer circuit BUFa slightly changes in accordance with a bias current. At a time t4 at which a sampling voltage used by the AD converter ADC is determined, the bias current of the noise removing circuit COLa<1> is the same as the bias currant at the time of execution of the noise cancelling operation, and accordingly, the AD converter ADC can sample an accurate voltage signal.

Similar to the operation described above, in a period from the time t4 to a time t4x, a column selection signal CSEL<2> and the control signal BOOST become "H," and accordingly, the video signal VSIG output from the noise removing circuit COLa<2> reaches a target voltage at a high speed. The target voltage is (VREF−VPIX<2>). In a period of the time t4x to a time t6, the control signal BOOST becomes "L," and accordingly, the noise removing circuit COLa<2> operates in accordance with the first current and outputs an accurate voltage signal.

Also after the time t6, similarly, column selection signals CSEL<3> to CSEL<n> sequentially become "H," and accordingly, the switches SS<3> to SS<n> to which column selection signals CSEL<3> to CSEL<n>, in which changes thereof occur, are supplied sequentially become short-circuited. For this reason, video signal VSIG are sequentially output from the noise removing circuits COLa<3> to COL<n> and are input to the AD converter ADC. In the operation shown in FIG. 10, in a period of the time t6 to a time t6x and a period of a time t7 to a time t7x, the buffer circuit BUFa operates in accordance with a second current higher than the first current.

In the operation shown in FIG. 10, the first current and the second current are supplied to the buffer circuit BUFa as bias currents. The first period is a period in which the control signal BOOST<k> is "H." The first period includes a timing at which a voltage of a video signal PIXOUT<k> output from the pixel P is switched. In other words, the first period includes the time t3, the time t4, the time t6, and the time t7. The second period is a period in which the control signal BOOST<k> is "L." As described above, the bias current in the first period, in other words, the second current is higher than the bias current in the second period, in other words, the first current.

In the noise removing circuit COLa according to the second embodiment, during the first period starting from a timing at which the video signal PIXOUT<k> is switched, the bias current of the buffer circuit BUFa is higher than the bias current in the second period. For this reason, the noise removing circuit COLa and the image sensor IMGa can drive a load circuit, in other words, the AD converter ADC at a high speed. Since the image sensor IMGa can drive the AD converter ADC at a high speed, the image sensor IMGa can perform imaging at a higher frame rate.

Third Embodiment

Figure 11:
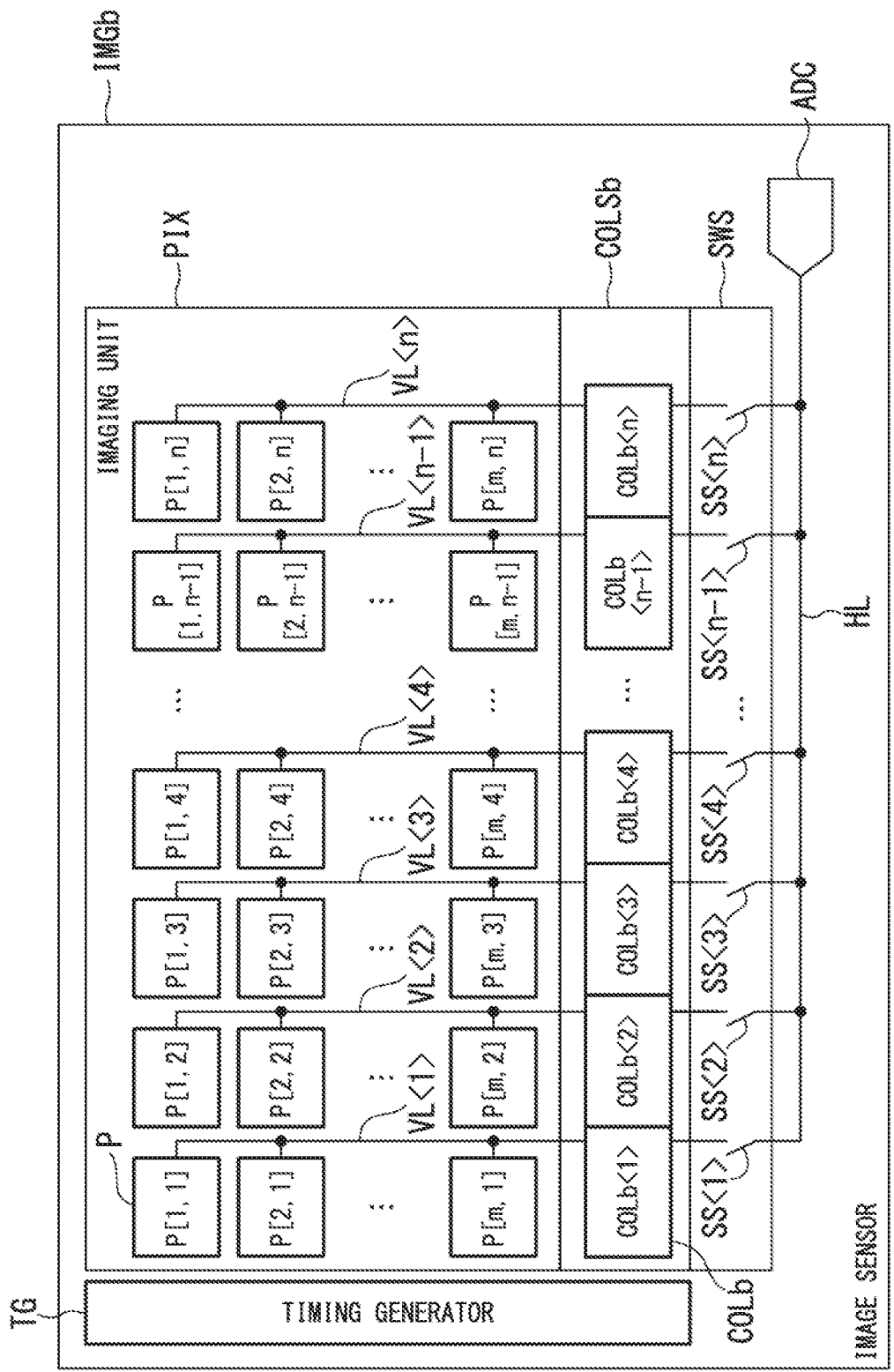
FIG. 11 is a block diagram showing the entire configuration am image sensor according to a third embodiment of the present invention.

The configuration of an image sensor IMGb according to a third embodiment of the present invention will be described with reference to FIG. 11. FIG. 11 shows the configuration of the image sensor IMGb. In the configuration shown in FIG. 11, points different from the configuration shown in FIG. 1 will be described.

In the image sensor IMGb, the noise removing unit COLS of the image sensor IMG shown in FIG. 1 is replaced with a noise removing unit COLSb. In the noise removing unit COLSb, the noise removing circuit COL of the noise removing unit COLS shown in FIG. 1 is replaced with a noise removing circuit COLb. Regarding points other than the points described above, the configuration shown in FIG. 11 is similar to the configuration shown in FIG. 1.

Figure 12:
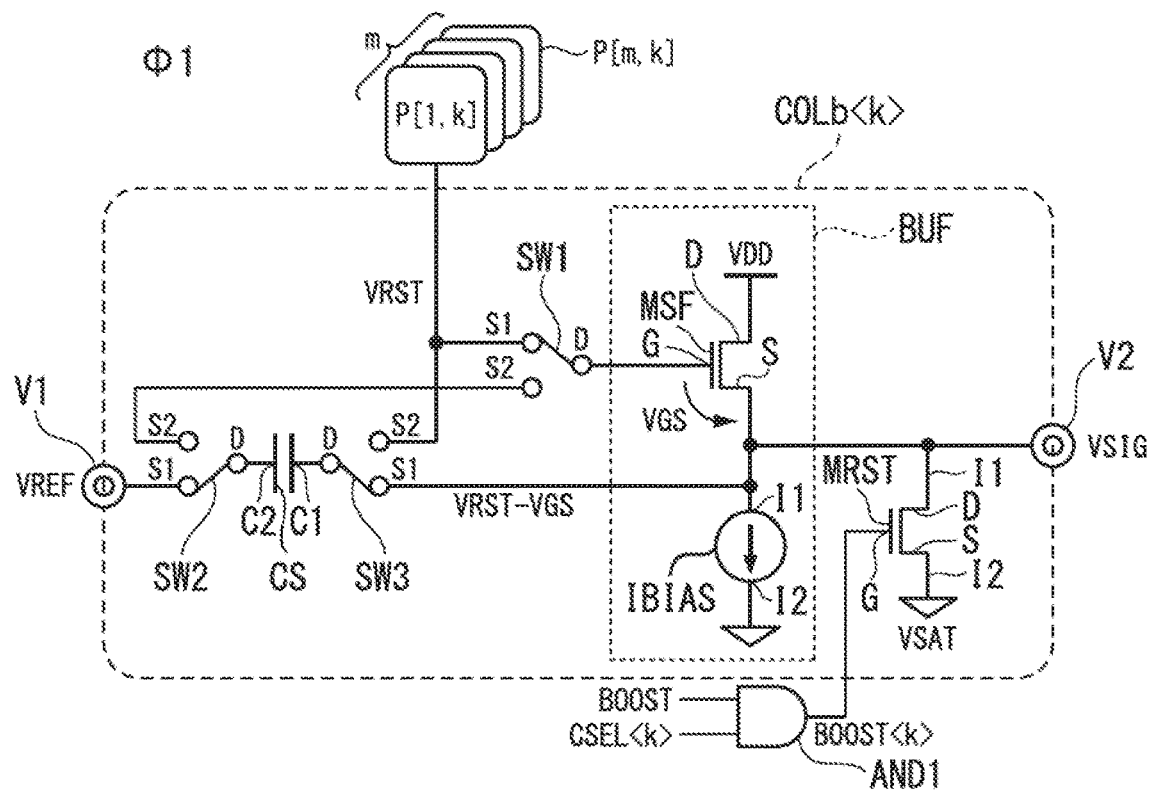
FIG. 12 is a circuit diagram showing the configuration of a noise removing circuit according to the third embodiment of the present invention.
Figure 13:
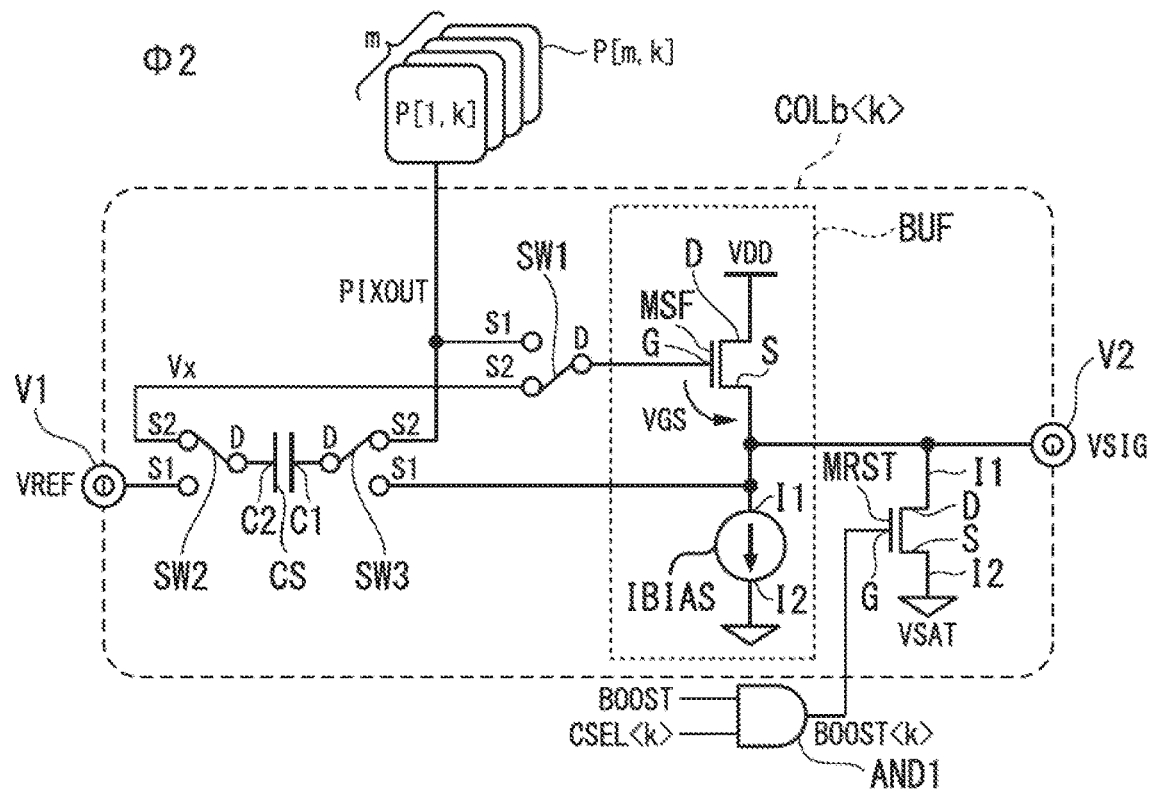
FIG. 13 is a circuit diagram showing the configuration of a noise removing circuit according to the third embodiment of the present invention.

The configuration of the noise removing circuit COLb will be described with reference to FIGS. 12 and 13. FIGS. 12 and 13 show the configuration of a noise removing circuit COLb<k> to which signals from pixels P[1,1] to P[m, k] of the k-th column are input. The configuration of a noise removing circuit COLb to which signals from pixels P of another column are input is the same as the configuration of the noise removing circuit COLb<k>. Hereinafter, the configuration and the operation of the noise removing circuit COLb<k> will be representatively described. In the configuration shown in FIGS. 12 and 13, points different from the configuration shown in FIGS. 4 and 5 will be described. FIG. 12 shows a state Φ1 of the noise removing circuit COLb<k>, and FIG. 13 shows a state Φ2 of the noise removing circuit COLb<k>.

The noise removing circuit COLb, in addition to the configuration included in the noise removing circuit COL shown in FIGS. 4 and 5, includes a reset transistor MRST. The reset transistor MRST includes a gate G, a source S, and a drain D. The drain D of the reset transistor MRST is connected to a source S of a column source follower transistor MSF and an output terminal V2 of a noise removing circuit COLb<k>. A reset voltage is input to the source S of the reset transistor MRST. The reset voltage is the same as a saturation voltage VSAT. In the following description, the reset voltage and the saturation voltage VSAT are handled the same. A control signal BOOST<k> is input to the gate G of the reset transistor MRST. In a case in which the control signal BOOST<k> is "L," the drain D and the source S of the reset transistor MRST are open. In a case in which the control signal BOOST<k> is "H," the drain D and the source S of the reset transistor MRST are electrically connected. At this time, the reset voltage, in other words, the saturation voltage VSAT is input to the source S of the column source follower transistor MSF.

An AND circuit AND1 calculates a logical product of a control signal BOOST and a column selection signal CSEL<k> and outputs a control signal BOOST<k>. The control signal BOOST is the same as the control signal BOOST according to the second embodiment.

By employing the configuration described above, only in a first period out of the first period and a second period, the reset voltage (VSAT) is input to the source S (fourth terminal) of the column source follower transistor MSF. The first period includes a timing at which a voltage of a signal output from a signal source is switched. The second period is different from the first period. In the first period and the second period, the sampling capacitor CS and the buffer circuit BUF are in a second state (Φ2).

Regarding points other than those described above, the configuration shown in FIGS. 12 and 13 is similar to the configuration shown in FIGS. 4 and 5.

Figure 14:
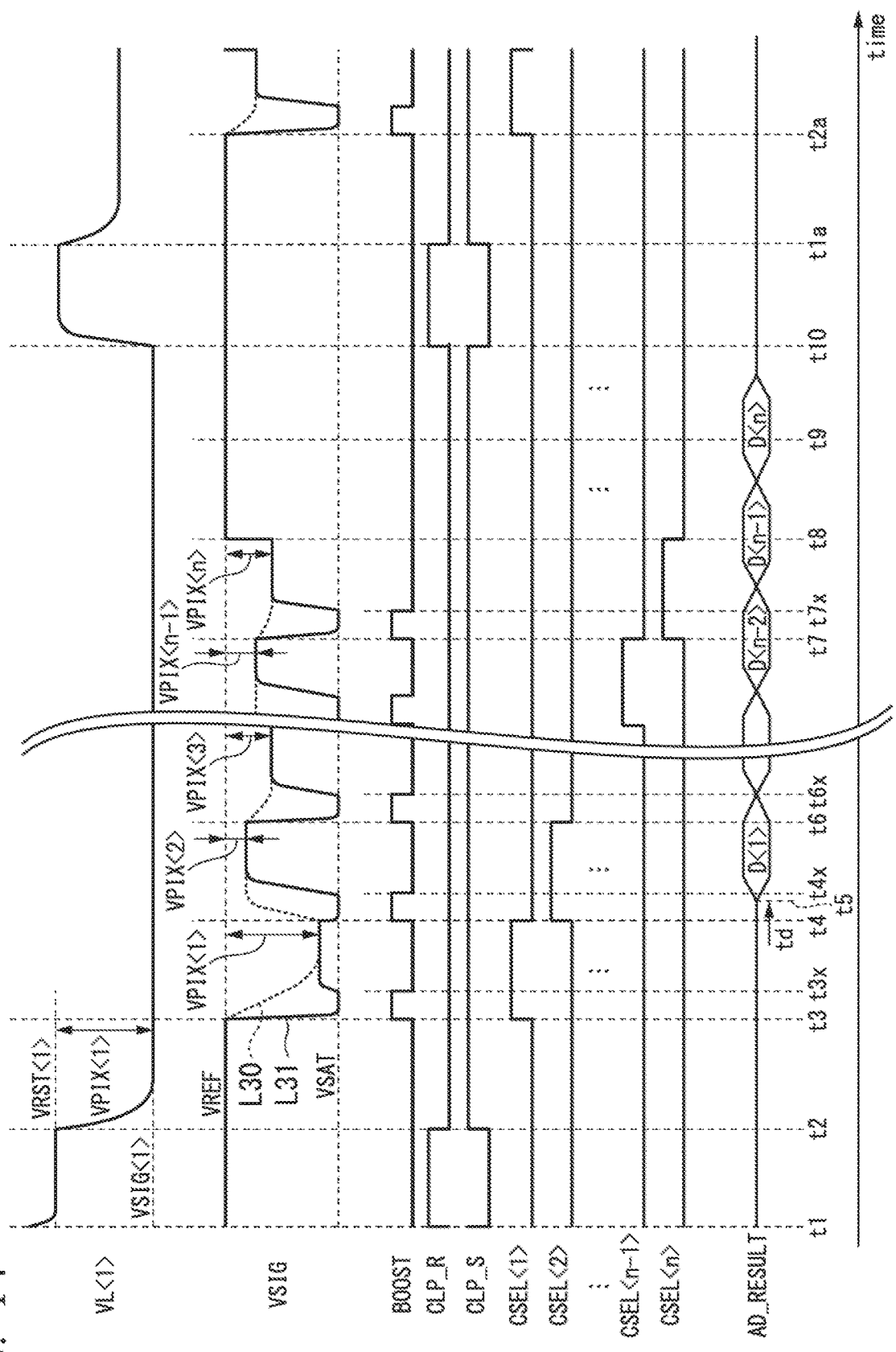
FIG. 14 is a timing diagram showing an operation of the image sensor according to the third embodiment of the present invention.

A signal reading operation using the image sensor IMGb will be described in more detail with reference to FIG. 14. FIG. 14 shows signals regarding the operation of the image sensor IMGb. In FIG. 14, points different from those shown in FIG. 3 will be described. In FIG. 14, in addition to the signals shown in FIG. 3, a control signal BOOST is shown.

Most of the operation of the image sensor IMGb is the same as the operation of the image sensor IMG according to the first embodiment, and thus, only featured parts of the operation of the image sensor IMGb will be described. In the image sensor IMGb, settling characteristics of the video signal VSIG are enhanced using the control signal BOOST and the reset transistor MRST. More specifically, a settling time when a saturated level of the pixel P is output is shortened. Settling of the video signal VSIG when the saturated level of the pixel P is output is difficult. For clear description of the enhancement of the settling characteristics, in FIG. 14, a transient response of a video signal VSIG output from the image sensor IMG is denoted by a line L30, and a transient response of a video signal VSIG output from the image sensor IMGb is denoted by a line L31.

At a time t1, noise removing circuits COLb<1> to COLb<n> start operations of sampling reset signals VRST<1> to VRST<n>. At a time t2, the noise removing circuits COLb<1> to COLb<n> start operations of sampling video signals PIXOUT<1> to PIXOUT<n>. At a time t3, the noise removing circuits COLb<1> to COLb<n> end the operations of sampling the video signals PIXOUT<1> to PIXOUT<n>. Inside the noise removing circuits COLb<1> to COLb<n>, reset noise of pixels and the like included in the video signals PIXOUT<1> to PIXOUT<n> input from the pixels P[1, 1] to P[1, n] are cancelled out. The noise removing circuits COLb<1> to COLb<n> store video signals VSIG having amplitudes of VPIX<1> to VPIX<n> a reference of which is the reference voltage VREF. The operations of the noise removing circuits COLb<1> to COLb<n> from the time t1 to the time t3 are the same as the operations of the noise removing circuits COL<1> to COL<n> shown in FIG. 3.

At the time t3, the column selection signal CSEL<1> becomes "H," and accordingly, a video signal VSIG having an amplitude of VPIX<1> is output from the noise removing circuit COLb<1> of the first column. At the time t3, the control signal BOOST becomes "H." Since both the column selection signal CSEL<1> and the control signal BOOST are "H," BOOST<k> that is a logical product thereof becomes "H" as well. Accordingly, the drain D and the source S of the reset transistor MRST are electrically connected. In a period of the time t3 to a time t3x, since the control signal BOOST is "H," the video signal VSIG instantly changes to the saturated voltage VSAT. At the time t3x, the control signal BOOST becomes "L." Accordingly, the control signal BOOST<k> becomes "L" as well, and thus, the drain D and the source S of the reset transistor MRST are open. Accordingly, the input of the saturated voltage VSAT to the source S of the column source follower transistor MSF ends. At this time, the buffer circuit BUF changes the amplitude of the video signal VSIG to (VREF−VPIX<1>) that is a target value.

The falling speed of a signal in a source follower constituting the buffer circuit BUF is determined in accordance with a bias current. On the other hand, the rising speed of a signal in the source follower is determined as being $\beta(VGS-VTH)^2$. Here, $\beta$ is a coefficient regarding the characteristics of a transistor, and VTH is a threshold voltage of the column source follower transistor MSF. Generally, it is known that the rising speed of a signal in a source follower is sufficiently higher than the falling speed thereof. In the operation shown in FIG. 14, the falling that determines the limit of the settling speed ends in a short period, and the video signal VSIG is settled to a target voltage in accordance with a rising operation that can be settled at a high speed. Thus, the maximum value of the settling time according to the third embodiment denoted by the line L31 is smaller than a maximum value of the settling time according to the first embodiment denoted by the line L30.

Similar to the operation described above, in a period of a time t4 to a time t4x, the column selection signal CSEL<2> and the control signal BOOST become "H," and accordingly, the video signal VSIG output from the noise removing circuit COLb<2> of the second column instantly becomes the saturated voltage VSAT. After the video signal VSIG becomes the saturated voltage VSAT, in a period of the time t4x to a time t6, the control signal BOOST becomes "L," and accordingly, the buffer circuit BUF performs an operation of settling the amplitude of the video signal VSIG to VPIX<2>. A voltage of the video signal VSIG having amplitude of VPIX<2> is close to a black level (VREF). After the video signal VSIG is changed to VSAT, in a case in which the amplitude of the video signal VSIG is returned to VPIX<2>, a settling time according to the first embodiment is shorter than a settling time according to the third embodiment. However, a condition that requires the longest time for settling in the noise removing circuit COLb is a transition from a voltage (VREF) corresponding to a black level to the saturated level (VSAT). It is apparent that the noise removing circuit COLb can shorten the time necessary for settling under such a condition.

Also after the time t6, similarly, column selection signals CSEL<3> to CSEL<n> sequentially become "H," and accordingly, the video signals VSIG are sequentially output from the noise removing circuit COLb<3> to COLb<n> and are input to the AD converter ADC. In the operation shown in FIG. 14, in a period of the time t6 to a time t6x and a period of a time t7 to a time t7x, the saturated voltage VSAT is input to the source S of the column source follower transistor MSF.

In the operation shown in FIG. 14, the first period is a period in which the control signal BOOST<k> is "H." The first period includes a timing at which a voltage of a video signal PIXOUT<k> output from the pixel P is switched. In other words, the first period includes the time t3, the time t4, the time t6, and the time t7. The second period is a period in which the control signal BOOST<k> is "L." As described above, only in the first period out of the first period and the second period, the reset voltage, in other words, the saturated voltage VSAT is input to the source S of the column source follower transistor MSF.

In the noise removing circuit COLb according to the third embodiment, during the first period starting from a timing at which the video signal PIXOUT<k> is switched, the video signal VSIG output from the noise removing circuit COLb instantly changes to the saturated voltage VSAT. For this reason, even in a case in which the bias current of the buffer circuit BUF is designed to be low, the longest time in the settling operation of the buffer circuit BUF can be shortened. Since the bias current of the buffer circuit BUF can be configured to be low, the noise removing circuit COLb and the image sensor IMGb can suppress power consumption. By shortening the settling time, the noise removing circuit COLb and the image sensor IMGb can drive a load circuit, in other words, the AD converter ADC at a high speed. Since the image sensor IMGb can drive the AD converter ADC at a high speed, the image sensor IMGb can perform imaging at a higher frame rate.

In the third embodiment, as an example for easy understanding of description, a case has been described in which the saturated voltage VSAT is input to the source S of the reset transistor MRST. When the voltage input to the source S of the reset transistor MRST is lower than the black level and is the saturated voltage VSAT or higher, the effects of the third embodiment can be reliably acquired. The reset voltage input to the source S of the reset transistor MRST may be shared by another circuit block. For example, the ground voltage may be used as the reset voltage. Alternatively, a voltage that is higher than the ground voltage and lower than the black level may be used as the reset voltage. In such a case, the effects of the third embodiment can be expected depending on design conditions.

Fourth Embodiment

Figure 15:
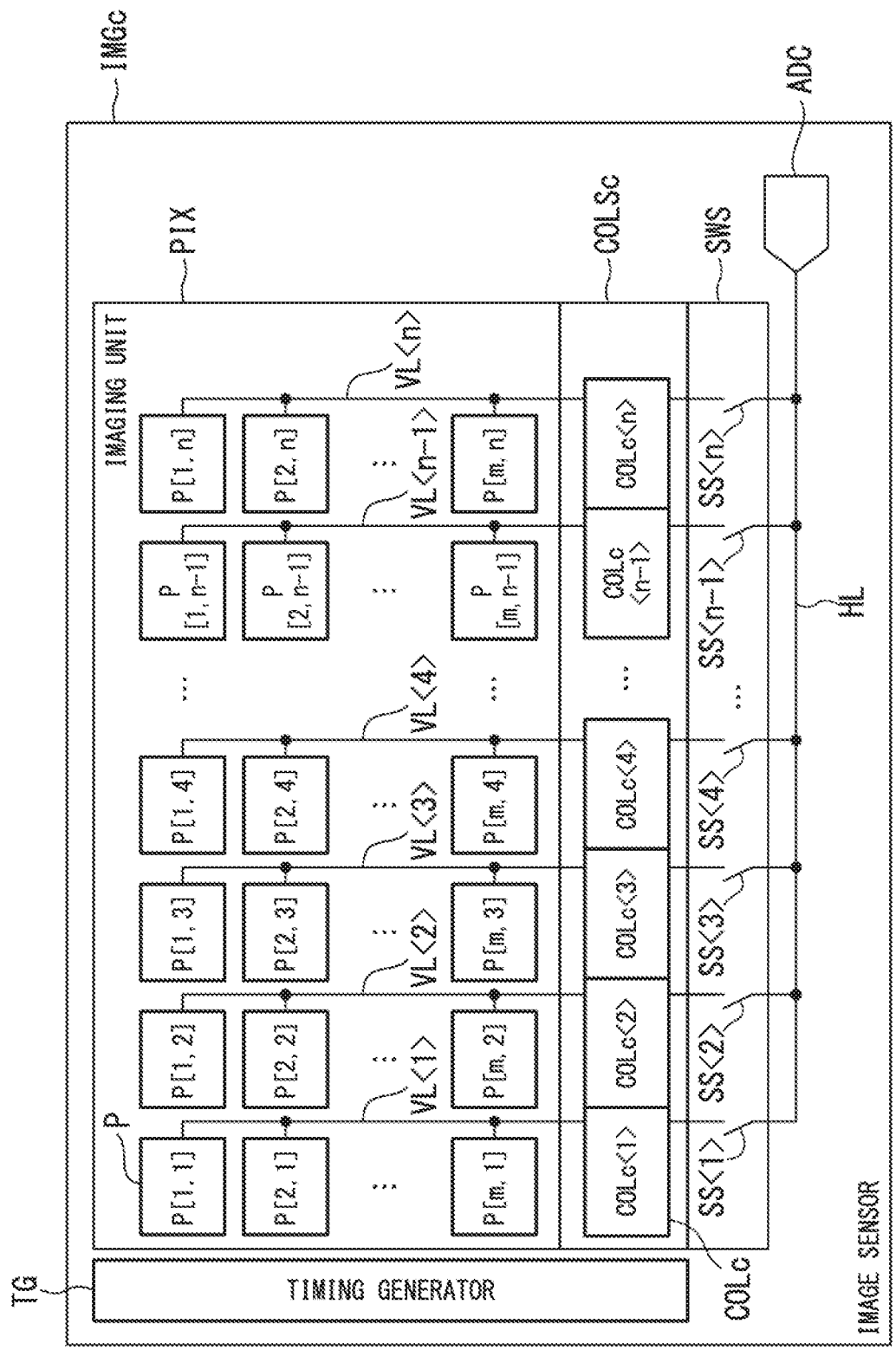
FIG. 15 is a block diagram showing the entire configuration of an image sensor according to a fourth embodiment of the present invention.

The configuration of an image sensor IMGc according to a fourth embodiment of the present invention will be described with reference to FIG. 15. FIG. 15 shows the configuration of the image sensor IMGc. In the configuration shown in FIG. 15, points different from the configuration shown in FIG. 1 will be described.

In the image sensor IMGc, the noise removing unit COLS of the image sensor IMG shown in FIG. 1 is replaced with a noise removing unit COLSc. In the noise removing unit COLSc, the noise removing circuit COL of the noise removing unit COLS shown in FIG. 1 is replaced with a noise removing circuit COLc. Regarding points other than the points described above, the configuration shown in FIG. 15 is similar to the configuration shown in FIG. 1.

Figure 16:
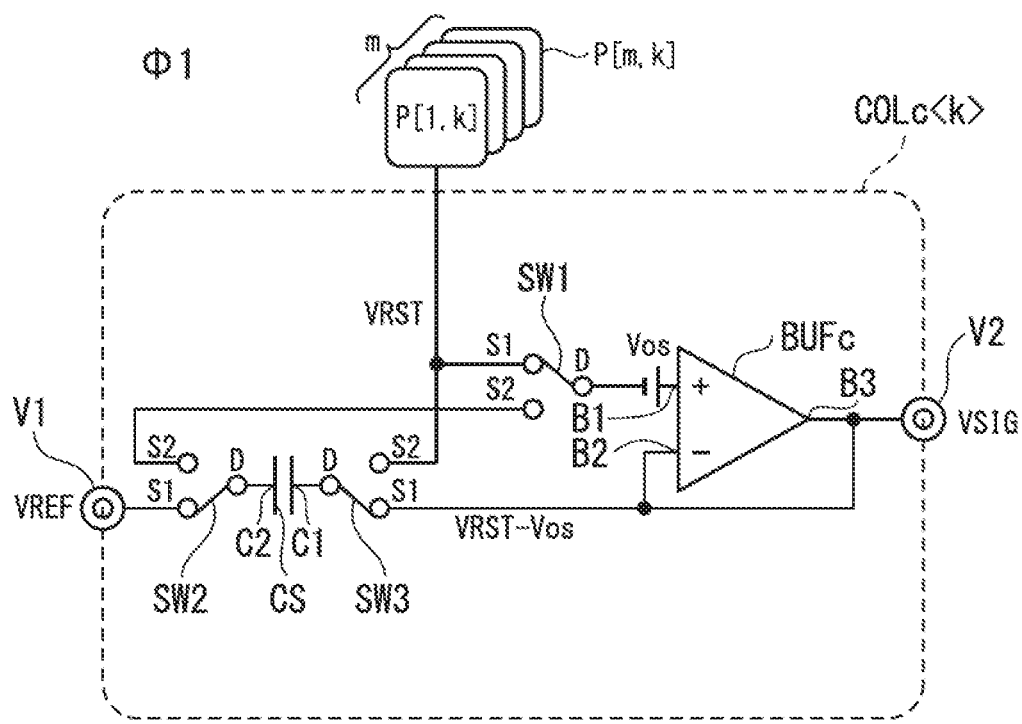
FIG. 16 is a circuit diagram showing the configuration of a noise removing circuit according to the fourth embodiment of the present invention.
Figure 17:
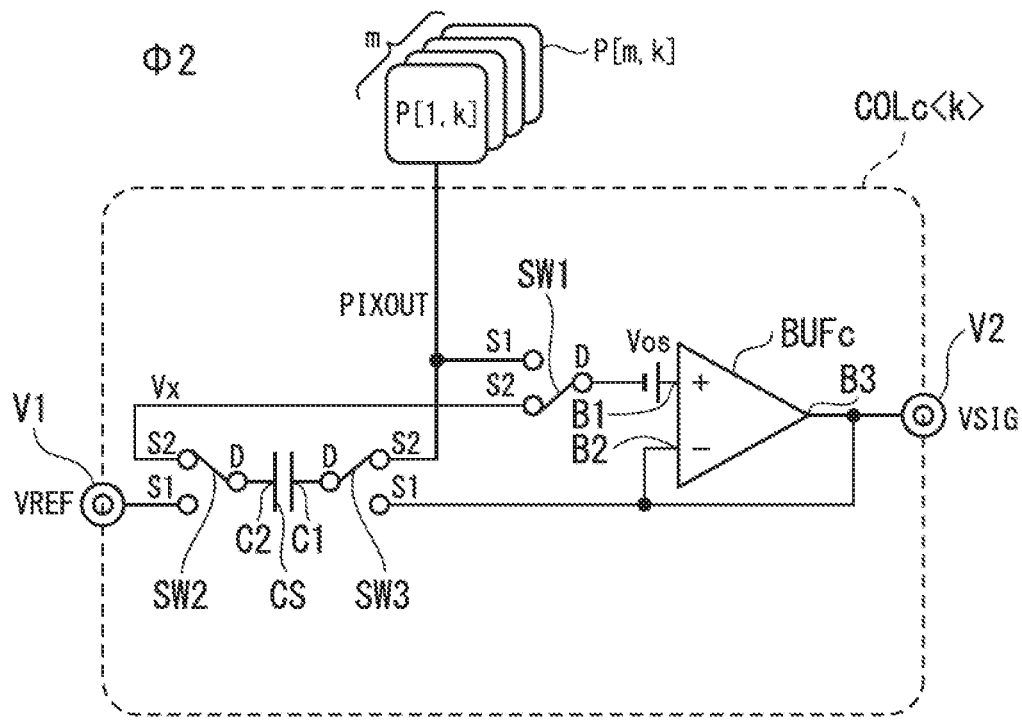
FIG. 17 is a circuit diagram showing the configuration of a noise removing circuit according to the fourth embodiment of the present invention.
Figure 18:
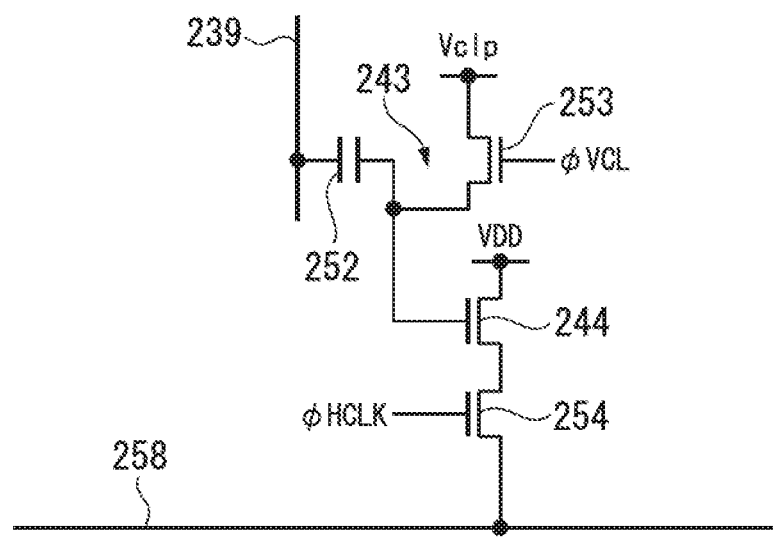
FIG. 18 is a circuit diagram showing the configuration of a noise removing unit and circuitry around thereof used in an image sensor according to a conventional technology.

The configuration of the noise removing circuit COLc will be described with reference to FIGS. 16 and 17. FIGS. 16 and 17 show the configuration of a noise removing circuit COLc<k> to which signals from pixels P[1, k] to P[m, k] of the k-th column are input. The configuration of a noise removing circuit COLc to which signals from pixels P of another column are input is the same as the configuration of the noise removing circuit COLc<k>. Hereinafter, the configuration and the operation of the noise removing circuit COLc<k> will be representatively described. In the configuration shown in FIGS. 16 and 17, points different from the configuration shown in FIGS. 4 and 5 will be described. FIG. 16 shows a state Φ1 of the noise removing circuit COLc<k>, and FIG. 17 shows a state Φ2 of the noise removing circuit COLc<k>.

In the noise removing circuit COLc, the buffer circuit BUF of the noise removing circuit COL shown in FIGS. 4 and 5 is replaced with a buffer circuit BUFc. The buffer circuit BUFc is an operational amplifier constituting a voltage follower. The buffer circuit BUFc includes a positive input terminal B1 (third terminal), a negative input to terminal B2 (fourth terminal), and an output terminal B3. The positive input terminal B1 of the buffer circuit BUFc is connected to a third terminal D of the switch SW1. A negative input terminal B2 of the buffer circuit BUFc is connected to the first terminal S1 of the switch SW3 and the output terminal B3 of the buffer circuit BUFc. The output terminal B3 of the buffer circuit BUFc is connected to the output terminal V2 of the noise removing circuit COLc<k>.

In the buffer circuit BUFc, an offset voltage Vos is generated. In FIGS. 16 and 17, the offset voltage Vos is represented as a voltage source inserted between the third terminal D of the switch SW1 and the positive input terminal B1 of the buffer circuit BUFc. A difference between a voltage of the positive input terminal B1 of the buffer circuit BUFc and a voltage of the negative input terminal B2 of the buffer circuit BUFc is a predetermined voltage (Vos).

Regarding points other than those described above, the configuration shown in FIGS. 16 and 17 is similar to the configuration shown in FIGS. 4 and 5.

The offset voltage Vos is cancelled out in accordance with the same principle as the principle described in the first embodiment. For this reason, the noise removing circuit COLc and the image sensor IMGc can eliminate the effects of the predetermined voltage (offset voltage Vos) inside the noise removing circuit COLc.

The buffer circuit BUF of the noise removing circuit COLb according to the third embodiment may be replaced with the buffer circuit BUFc. The buffer circuits BUF, BUFa, and BUFc according to the embodiments of the present invention may be configured as different voltage buffer circuits.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A noise removing circuit comprising:
   a capacitor including a first terminal and a second terminal and sampling a signal output from a signal source;
   a buffer circuit including a third terminal and a fourth terminal, a difference between a voltage of the third terminal and a voltage of the fourth terminal being a predetermined voltage; and
   a switch configured to set the capacitor and the buffer circuit to be in one of a first state and a second state, wherein, in the first state, the first terminal is connected to the fourth terminal, a reference voltage is input to the second terminal, and the third terminal is connected to the signal source, and in the second state, the first terminal is connected to the signal source, and the second terminal is connected to the third terminal.

2. The noise removing circuit according to claim 1, wherein a bias current is supplied to the buffer circuit, the bias current in a first period is higher than the bias current in a second period, the first period includes a timing at which a voltage of the signal output from the signal source is switched, the second period is different from the first period, and the capacitor and the buffer circuit are in the second state in the first period and the second period.

3. The noise removing circuit according to claim 1, wherein a reset voltage is input to the fourth terminal only in a first period out of the first period and a second period, the first period includes a timing at which a voltage of the signal output from the signal source is switched, the second period is different from the first period, and the capacitor and the buffer circuit are in the second state in the first period and the second period.

4. An image sensor comprising:

a plurality of noise removing circuit including the noise removing circuit according to claim 1; and a plurality of pixels disposed in a matrix pattern;

wherein the noise removing circuit is disposed for each column of the plurality of pixels, and the signal source is the pixels.

* * * * *